(12) United States Patent
Arakane

(10) Patent No.: US 10,232,625 B2
(45) Date of Patent: Mar. 19, 2019

(54) INK-JET PRINTER

(71) Applicant: BROTHER KOGYO KABUSHIKI KAISHA, Nagoya-shi, Aichi-ken (JP)

(72) Inventor: Satoru Arakane, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/470,644

(22) Filed: Mar. 27, 2017

(65) Prior Publication Data
US 2017/0300276 A1    Oct. 19, 2017

(30) Foreign Application Priority Data

Apr. 18, 2016    (JP) ................................ 2016-082663

(51) Int. Cl.
   *B41J 2/165*    (2006.01)
   *B41J 2/17*    (2006.01)
   *G06F 3/12*    (2006.01)

(52) U.S. Cl.
   CPC ......... *B41J 2/1714* (2013.01); *B41J 2/16508* (2013.01); *B41J 2/16526* (2013.01); *B41J 2/17* (2013.01); *G06F 3/1275* (2013.01); *G06F 3/1296* (2013.01); *G06F 3/1212* (2013.01)

(58) Field of Classification Search
   CPC ........ B41J 2/1714; B41J 2/17; B41J 2/16508; B41J 2/16526; G06F 3/1275; G06F 3/1296; G06F 3/1212
   See application file for complete search history.

(56) References Cited

U.S. PATENT DOCUMENTS

| | | | |
|---|---|---|---|
| 6,746,097 B2 * | 6/2004 | Im | B41J 2/1652 347/23 |
| 2001/0020962 A1 | 9/2001 | Kanaya et al. | |
| 2009/0244174 A1 * | 10/2009 | Hibi | B41J 2/16544 347/33 |
| 2015/0091957 A1 * | 4/2015 | Arakane | B41J 25/34 347/9 |

FOREIGN PATENT DOCUMENTS

| | | |
|---|---|---|
| JP | 3587111 A | 11/2004 |
| JP | 5014763 A | 8/2012 |

* cited by examiner

*Primary Examiner* — Yaovi M Ameh
(74) *Attorney, Agent, or Firm* — Merchant & Gould P.C.

(57) ABSTRACT

An ink-jet printer includes a conveyor, a carriage, a recording head, an ink receiver, a command receiver, and a controller. The controller executes: determining an ink amount that the recording head should discharge to the ink receiver; executing a flushing process that moves the carriage to an area facing the ink receiver and causes each of a plurality of nozzles to discharge ink of the determined ink amount; and based on the flushing process having finished, executing a recording process. The controller, based on the determined ink amount being less than a first threshold value, causes the recording head to discharge ink of the determined ink amount in α times of the flushing processes, and based on the determined ink amount being the first threshold value or more, causes the recording head to discharge ink of the determined ink amount dispersed in $\beta(\beta>\alpha)$ times of the flushing processes.

16 Claims, 10 Drawing Sheets

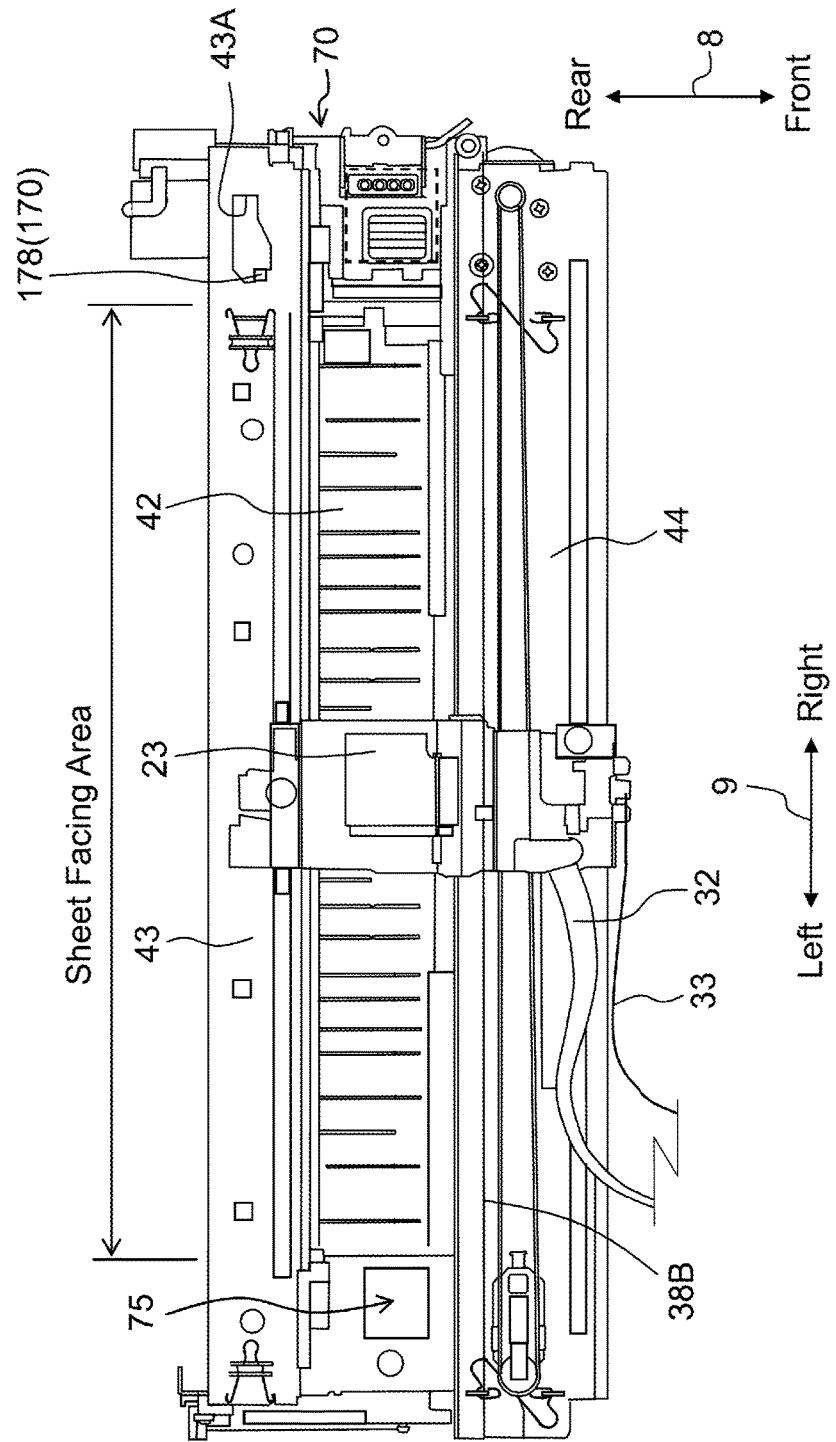

INK-JET PRINTER

CROSS REFERENCE TO RELATED APPLICATION

The present application claims priority from Japanese Patent Application No. 2016-082663 filed on Apr. 18, 2016, the disclosure of which is incorporated herein by reference in its entirety.

BACKGROUND

Field of the Invention

The present invention relates to an ink-jet printer that records an image on a sheet, based on a recording command received from an information processing apparatus via a communication network.

Description of the Related Art

In the past, attempts have been made to reduce FPOT (abbreviation of First Print Out Time) in an information processing apparatus and printer connected via a communication network. FPOT is a time from a print instruction being inputted to the external apparatus to a first sheet being discharged from the printer.

Reducing a time of a preparation process is conceivable as one of methods for reducing FPOT. The preparation process is a process that should be executed by the printer before recording an image on the sheet, and includes, for example, the likes of a flushing process in which a recording head is caused to discharge ink toward an ink receiver. Moreover, for example, a flushing process in which ink is discharged while a carriage is moved, is known as a method for reducing a time of the flushing process.

SUMMARY

However, an amount of ink that should be discharged in the flushing process is increased/decreased based on a state of the printer. That is, if the amount of ink that should be discharged is large, there is a possibility that all of the ink cannot be completely discharged while the carriage is passing over an area facing the ink receiver. Moreover, if the amount of ink discharged in the flushing process is insufficient, there is a possibility that image recording quality deteriorates.

The present teaching was made in view of the above-described circumstances, and has an object of providing an ink-jet printer in which FPOT is reduced while image recording quality is maintained.

A first aspect of the present teaching provides an ink-jet printer including:

a conveyor configured to convey a sheet in a conveyance direction;

a carriage being movable in a scanning direction along a sheet facing area, the scanning direction intersecting the conveyance direction, and the sheet facing area facing the sheet conveyed by the conveyor;

a recording head mounted on the carriage to discharge ink from a plurality of nozzles aligned in the scanning direction;

an ink receiver disposed to face the recording head that is located at a first position displaced in the scanning direction from the sheet facing area;

a command receiver; and a controller configured to control the conveyor, the carriage and the recording head to execute:

determining an amount of ink to be discharged to the receiver by the recording head;

performing a flushing process in which the carriage is moved to an area facing the ink receiver and the ink of the determined ink amount is discharged from each of the plurality of the nozzles, under a condition that the command receiver receives a recording command which is an instruction to record an image on the sheet;

performing a printing process, under a condition that the flushing process has finished;

discharging the ink of the determined ink amount in $\alpha$ times of the flushing processes, under a condition that the determined ink amount is less than a first threshold value; and discharging the ink of the determined ink amount dispersed in $\beta(\beta>\alpha)$ times of the flushing processes, under a condition that the determined ink amount is not less than the first threshold value.

Due to the above-described configuration, a number-of-times that a carriage is moved in an area facing an ink receiver is increased/decreased based on an ink amount that should be discharged. As a result, ink required to maintain image recording quality can be reliably discharged in a flushing process. Moreover, since ink is discharged while the carriage is being moved in the flushing process, FPOT can be reduced more compared to when the flushing process is executed in a state where the carriage has been stopped.

Moreover, in the above-described embodiment, when an ink amount determined in a determining process is large, a required ink amount is dispersed in a plurality of times of the flushing process. As a result, elapsed time after ink being finally discharged can be smoothed between a nozzle that initially discharged ink and a nozzle that finally discharged ink. As a result, deterioration of image recording quality can be further suppressed.

A second aspect of the present teaching provides an ink-jet printer including:

a conveyor configured to convey a sheet in a conveyance direction;

a carriage being movable in a scanning direction along a sheet facing area, the scanning direction intersecting the conveyance direction, and the sheet facing area facing the sheet conveyed by the conveyor;

a recording head mounted on the carriage to discharge ink from a plurality of nozzles disposed in the scanning direction;

an ink receiver facing the recording head in a case that the carriage is positioned in a second position which is a position displaced in the scanning direction from the sheet facing area, the second position being different from the first position;

a command receiver; and a controller configured to control the conveyor, the carriage and the recording head to execute:

determining an ink amount that the recording head is to discharge to the ink receiver;

performing a flushing process in which the carriage is moved to an area facing the ink receiver and ink of the determined ink amount is discharged from each of a plurality of the nozzles, under a condition that the command receiver receives a recording command which is an instruction to record an image on the sheet;

performing a printing process under a condition that the flushing process has finished;

in the flushing process, moving the carriage at a first speed in a case that the determined ink amount is less than a threshold value; and in the flushing process, moving the carriage at a second speed which is slower than the first speed, in a case that the determined ink amount is not less than the threshold value.

Due to the above-described configuration, a movement speed of a carriage in an area facing an ink receiver is increased/decreased based on an ink amount that should be discharged. As a result, ink required to maintain image recording quality can be reliably discharged in a flushing process.

Due to the present teaching, since the flushing process is executed while the carriage is being moved and the number-of-times of the flushing processes is increased/decreased based on the ink amount that should be discharged, FPOT can be reduced while image recording quality is maintained.

BRIEF DESCRIPTION OF THE DRAWINGS

FIG. 3 depicts a plan view of a carriage 23 and guide rails 43, 44.

DESCRIPTION OF THE EMBODIMENTS

Figure 1:
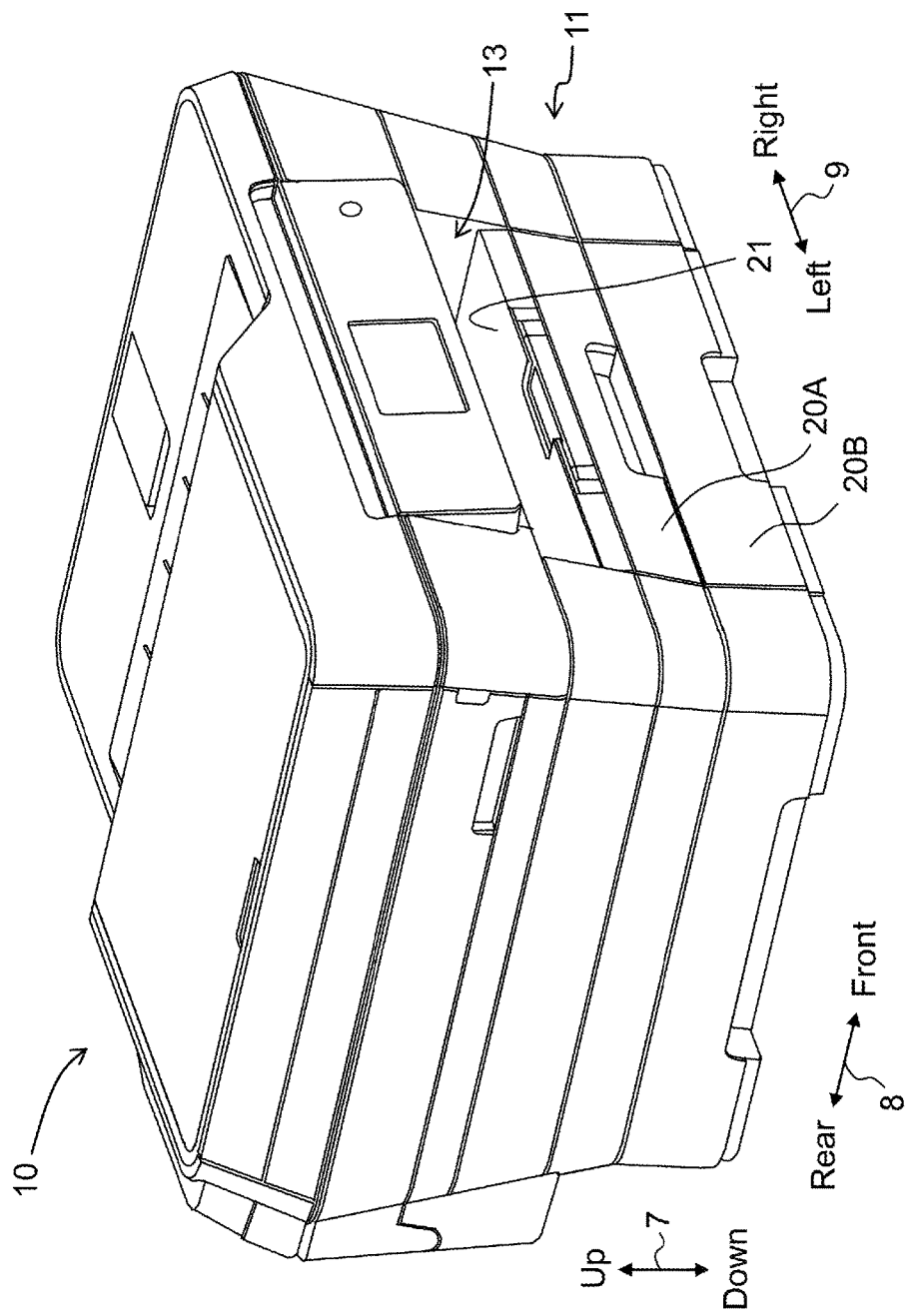
FIG. 1 depicts a perspective view of external appearance of a multifunction peripheral 10.

An embodiment of the present teaching will be described below. Note that the embodiment described below is merely an example of the present teaching, and it goes without saying that the embodiment of the present teaching may be appropriately changed in a range that does not alter the gist of the present teaching. An up-down direction 7 is defined with reference to a state in which a multifunction peripheral 10 is usably disposed (state of FIG. 1), a front-rear direction 8 is defined assuming a side provided with an opening 13 to be a near side (front surface), and a left-right direction 9 is defined viewing the multifunction peripheral 10 from the near side (front surface).

[Overall Configuration of Multifunction Peripheral 10]

As depicted in FIG. 1, the multifunction peripheral 10 is roughly formed into a rectangular parallelepiped. The multifunction peripheral 10 includes a printer 11. The multifunction peripheral 10 is an example of an ink-jet printer. Moreover, the multifunction peripheral 10 may further include the likes of a scanner that reads a manuscript to generate image data.

[Printer 11]

Figure 2:
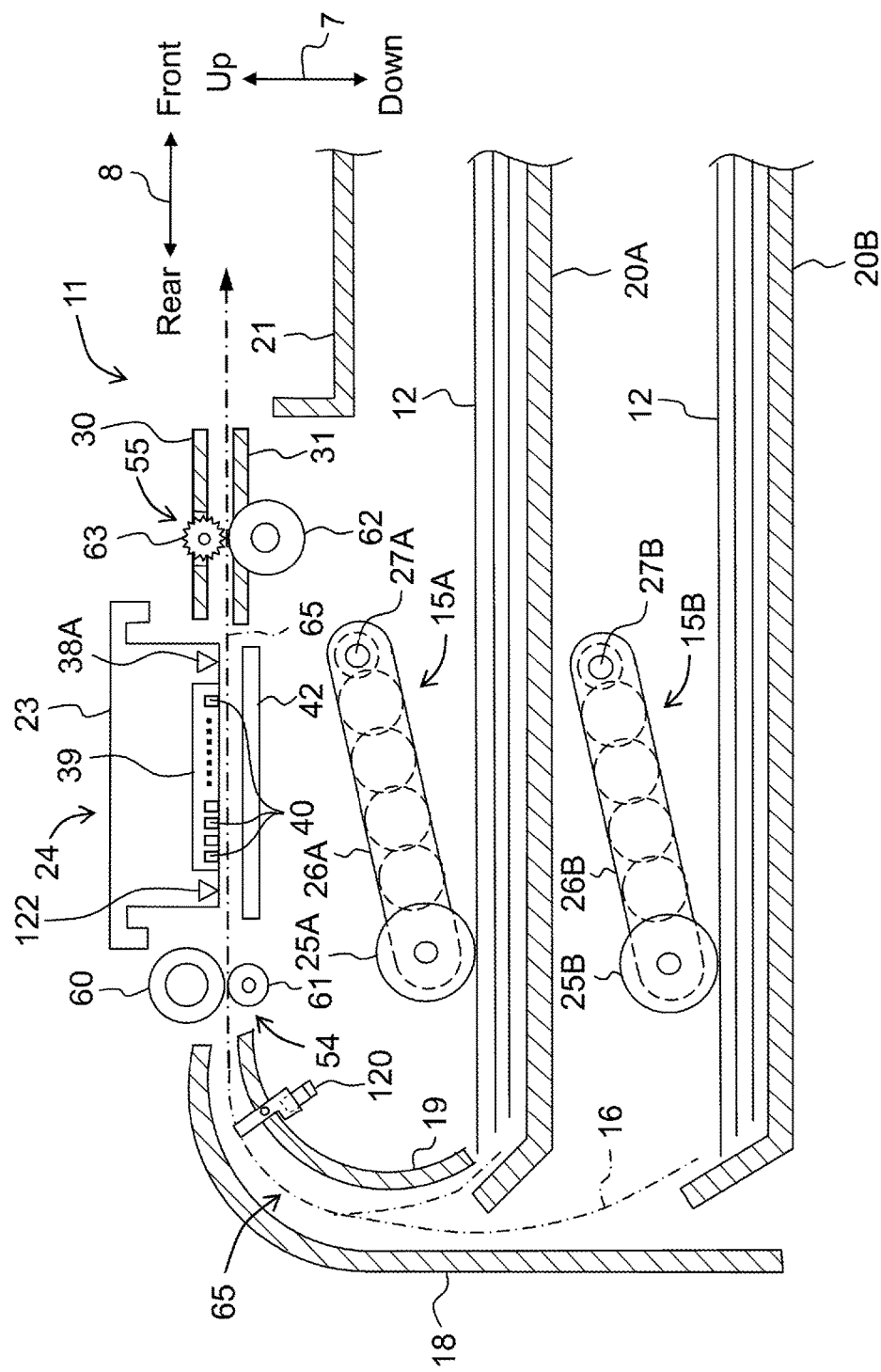
FIG. 2 depicts a longitudinal cross-sectional view showing schematically an internal structure of a printer 11.

The printer 11 discharges ink, thereby recording on a sheet 12 (refer to FIG. 2) an image depicted by the image data. That is, the printer 11 adopts a so-called ink-jet recording system. As depicted in FIG. 2, the printer 11 includes feed sections 15A, 15B, feed trays 20A, 20B, a discharge tray 21, a conveyance roller section 54, a recording section 24, a discharge roller section 55, and a platen 42. The conveyance roller section 54 and the discharge roller section 55 are examples of a conveyor.

[Feed Trays 20A, 20B and Discharge Tray 21]

The opening 13 (refer to FIG. 1) is formed in a front surface of the printer 11. The feed trays 20A, 20B are inserted and removed in the front-rear direction 8 via the opening 13. The feed trays 20A, 20B each support a stacked plurality of the sheets 12. The discharge tray 21 supports the sheet 12 discharged by the discharge roller section 55 via the opening 13.

[Feed Sections 15A, 15B]

As depicted in FIG. 2, the feed section 15A includes a feed roller 25A, a feed arm 26A, and a shaft 27A. The feed roller 25A is rotatably supported by a distal end of the feed arm 26A. The feed arm 26A is pivotably supported by the shaft 27A which is supported by a frame of the printer 11. The feed arm 26A is pivotally biased toward the feed tray 20A by an elastic force due to the likes of its own weight or a spring. The feed section 15B includes a feed roller 25B, a feed arm 26B, and a shaft 27B. A specific configuration of the feed section 15B is common to that of the feed section 15A. As a result of the feed roller 25A rotating by a forward rotational drive force of a feed motor 101 (refer to FIG. 6) being transmitted to the feed roller 25A, the feed section 15A feeds to a conveyance path 65 the sheet 12 supported by the feed tray 20A. As a result of the feed roller 25B rotating by the forward rotational drive force of the feed motor 101 being transmitted to the feed roller 25B, the feed section 15B feeds to the conveyance path 65 the sheet 12 supported by the feed tray 20B.

[Conveyance Path 65]

The conveyance path 65 indicates a space formed by guide members 18, 30 and guide members 19, 31. The guide members 18, 30 and the guide members 19, 31 face each other with a certain spacing between them on the inside of the printer 11. The conveyance path 65 is a path that extends from a rear end section of the feed trays 20A, 20B to a rear side of the printer 11. Moreover, the conveyance path 65 is a path that makes a U-turn while extending from a downward side to an upward side at the rear side of the printer 11, and that passes through the recording section 24 to reach the discharge tray 21. Note that a conveyance direction 16 of the sheet 12 in the conveyance path 65 is indicated by a dot-chain line arrow in FIG. 2.

[Conveyance Roller Section 54]

The conveyance roller section 54 is disposed upstream in the conveyance direction 16 of the recording section 24. The conveyance roller section 54 includes a conveyance roller 60 and a pinch roller 61 that face each other. The conveyance roller 60 is driven by a conveyance motor 102 (refer to FIG. 6). The pinch roller 61 rotates in company with rotation of the conveyance roller 60. The sheet 12 is nipped by the conveyance roller 60 that forwardly rotates by a forward rotational drive force of the conveyance motor 102 being transmitted thereto, and the pinch roller 61, whereby the sheet 12 is conveyed along the conveyance direction 16. Moreover, the conveyance roller 60 reversely rotates in a reverse orientation to forward rotation, by a reverse rotational drive force of the conveyance motor 102 being transmitted thereto.

[Discharge Roller Section 55]

The discharge roller section 55 is disposed downstream in the conveyance direction 16 of the recording section 24. The discharge roller section 55 includes a discharge roller 62 and a spur wheel 63 that face each other. The discharge roller 62 is driven by the conveyance motor 102. The spur wheel 63 rotates in company with rotation of the discharge roller 62. The sheet 12 is nipped by the discharge roller 62 that forwardly rotates by the forward rotational drive force of the conveyance motor 102 being transmitted thereto, and the spur wheel 63, whereby the sheet 12 is conveyed along the conveyance direction 16.

[Resist Sensor 120]

As depicted in FIG. 2, the printer 11 includes a resist sensor 120. The resist sensor 120 is arranged upstream in the conveyance direction 16 of the conveyance roller section 54. The resist sensor 120 outputs different detection signals depending on whether the sheet 12 exists at an arrangement position of the resist sensor 120 or not. The resist sensor 120 outputs a high level signal to a later-mentioned controller 130 (refer to FIG. 6), based on the sheet 12 existing at the arrangement position. On the other hand, the resist sensor 120 outputs a low level signal to the controller 130, based on the sheet 12 not existing at the arrangement position. Note that the detection signals outputted by the resist sensor 120 are not limited to the above-described combination of a high level signal and a low level signal. It is only required that the detection signals differ depending on whether the sheet 12 exists at the arrangement position or not.

[Rotary Encoder 121]

Figure 6:
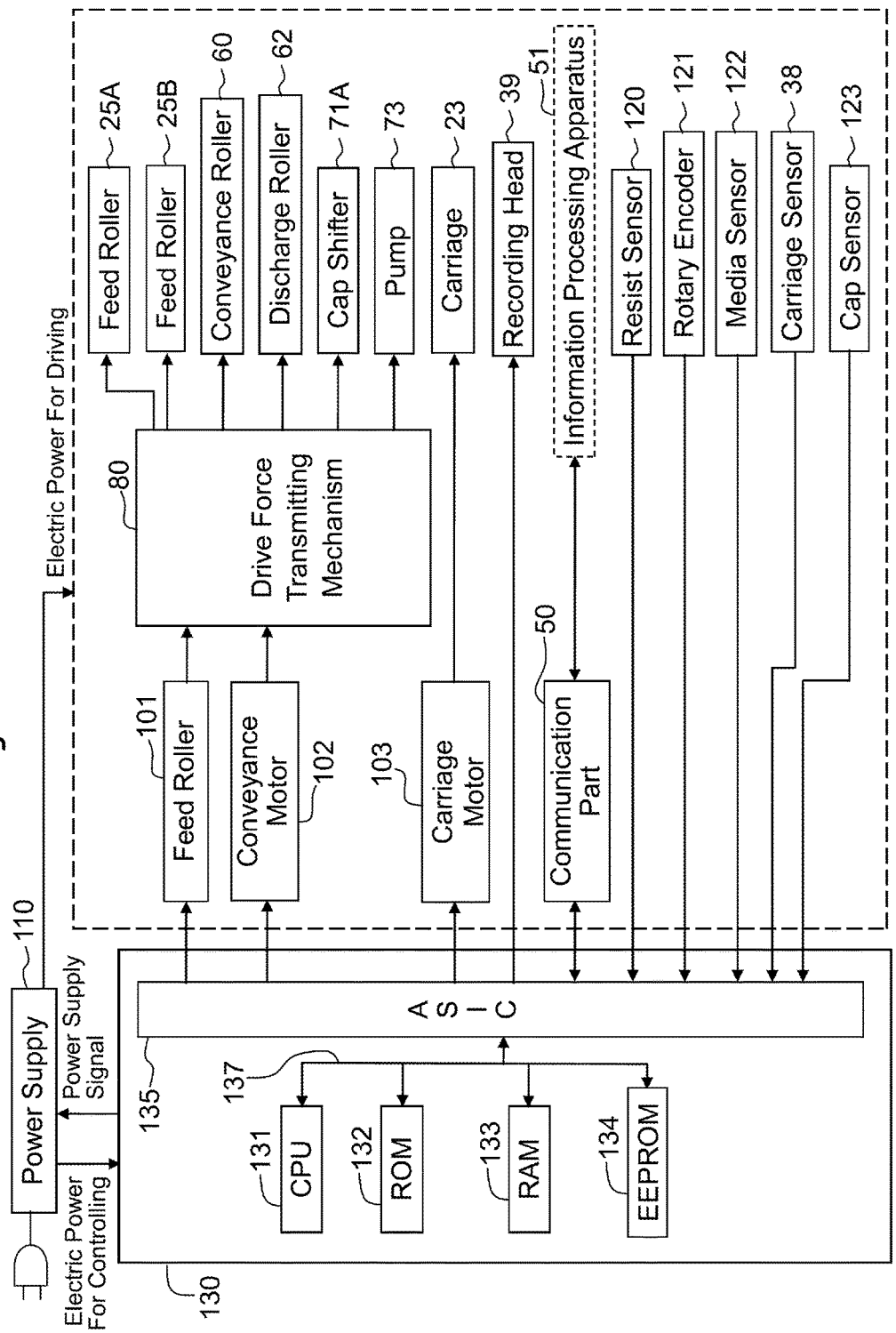
FIG. 6 depicts a block diagram of the multifunction peripheral 10.
Figure 7:
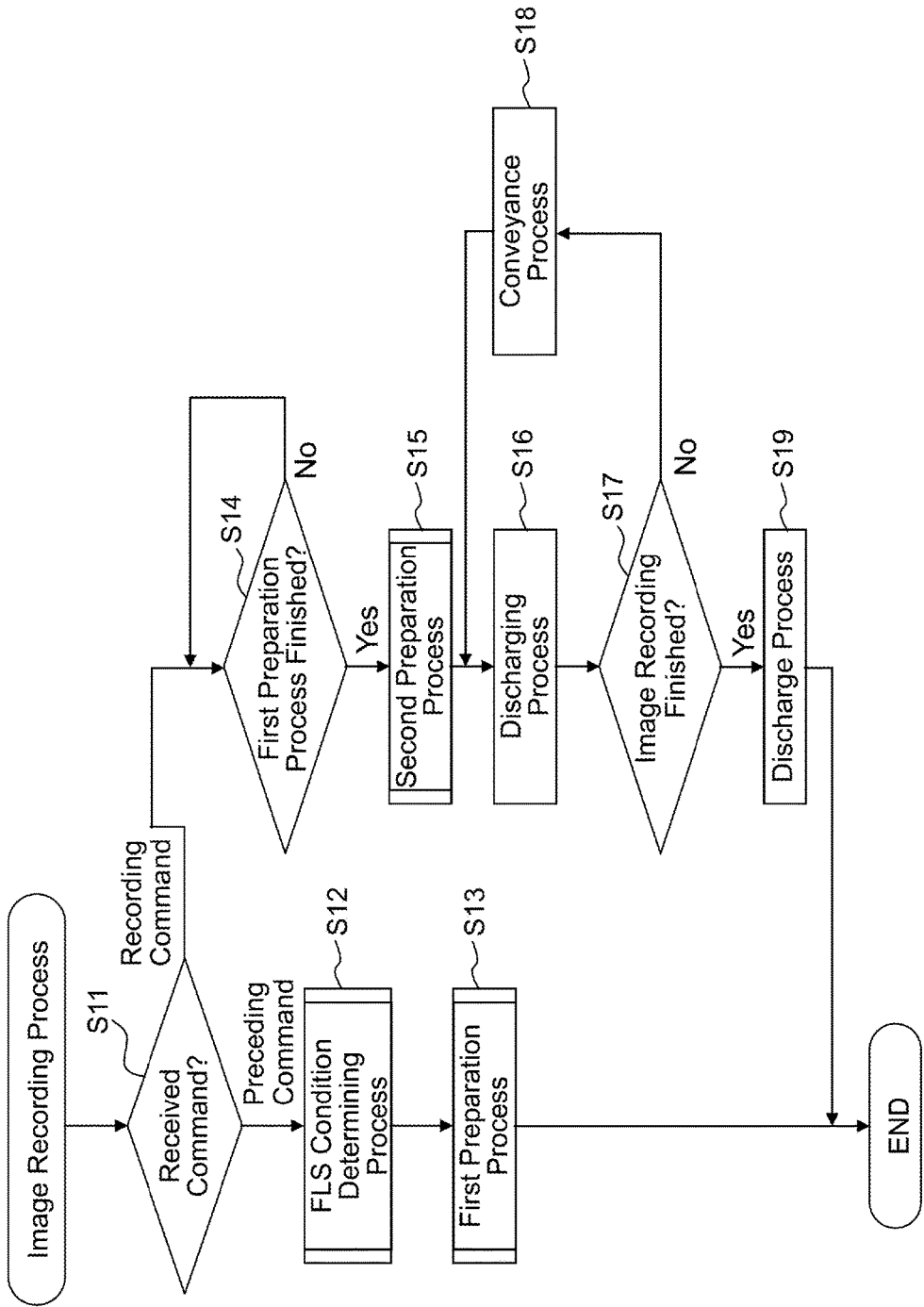
FIG. 7 depicts a flowchart of an image recording process.
Figure 8:
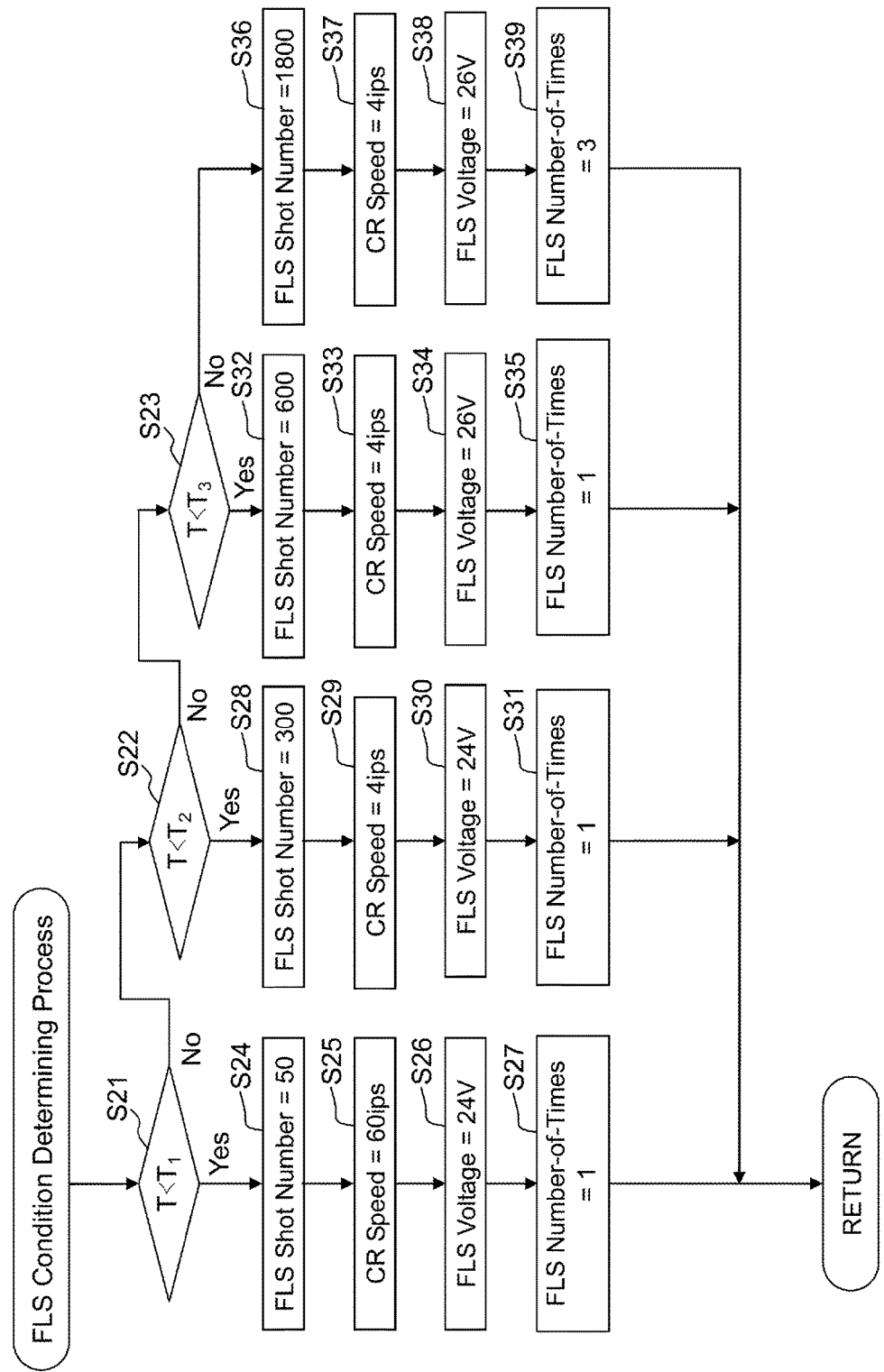
FIG. 8 depicts a flowchart of an FLS condition determining process.

As depicted in FIG. 6, the printer 11 includes a rotary encoder 121 that generates a pulse signal based on rotation of the conveyance roller 60 (in other words, rotational drive of the conveyance motor 102). The rotary encoder 121 includes an encoder disk and an optical sensor. The encoder disk rotates along with rotation of the conveyance roller 60. The optical sensor reads the rotating encoder disk to generate a pulse signal and outputs the generated pulse signal to the controller 130.

[Recording Section 24]

As depicted in FIG. 2, the recording section 24 is disposed between the conveyance roller section 54 and the discharge roller section 55 in the conveyance direction 16. Moreover, the recording section 24 is disposed facing the platen 42 in the up-down direction 7. The recording section 24 includes a carriage 23, a recording head 39, an encoder sensor 38A, and a media sensor 122. Moreover, as depicted in FIG. 3, an ink tube 32 and a flexible flat cable 33 are connected to the carriage 23. The ink tube 32 supplies ink of an ink cartridge to the recording head 39. The flexible flat cable 33 electrically connects a control board on which the controller 130 is mounted and the recording head 39.

As depicted in FIG. 3, the carriage 23 is supported by guide rails 43, 44 each provided extending in the left-right direction 9, at positions separated in the front-rear direction 8. The carriage 23 is coupled to a publicly known belt mechanism disposed in the guide rail 44. Note that this belt mechanism is driven by a carriage motor 103 (refer to FIG. 6). In other words, the carriage 23 which is connected to the belt mechanism that makes a circuitous motion due to drive of the carriage motor 103, can make reciprocating movement in the left-right direction 9. The left-right direction 9 is an example of a scanning direction.

As depicted in FIG. 2, the recording head 39 is mounted in the carriage 23. A plurality of nozzles 40 are formed in a lower surface (hereafter, described as "nozzle surface") of the recording head 39. The recording head 39 discharges ink from the nozzle 40 due to a vibrating element such as a piezo element being vibrated. In a process of the carriage 23 moving, the recording head 39 discharges an ink droplet onto the sheet 12 supported by the platen 42. As a result, an image is recorded on the sheet 12.

The vibrating element is an example of a discharge energy generating element that generates, from a drive voltage applied by a power supply section 110, energy (that is, vibrational energy) for discharging ink from the nozzle. However, a specific example of the discharge energy generating element is not limited to a vibrating element, and may be, for example, a heater that generates thermal energy. Moreover, the heater may heat the ink by thermal energy generated from the drive voltage applied by the power supply section 110 and discharge foamed ink from the nozzle. Moreover, the recording head 39 according to the present embodiment discharges pigment ink, but it may discharge dye ink.

As depicted in FIGS. 2 and 4, the plurality of nozzles 40 are arranged in the front-rear direction 8 and the left-right direction 9. A plurality of the nozzles 40 arranged in the front-rear direction 8 (hereafter, described as a "nozzle column") discharge identically-colored ink. The nozzle surface has formed therein 24 nozzle columns arranged in the left-right direction 9. Moreover, six adjacent nozzle columns at a time discharge identically-colored ink. In the present embodiment, the six nozzle columns from a right end discharge black ink, the six nozzle columns next to the black-ink-discharging nozzle columns discharge yellow ink, the six nozzle columns next to the yellow-ink-discharging nozzle columns discharge cyan ink, and the six nozzle columns from a left end discharge magenta ink. However, the number of nozzle columns and combination of colors of ink discharged are not limited to those of the previously mentioned example.

Moreover, as depicted in FIG. 3, a strip-like encoder strip 38B extending in the left-right direction 9 is disposed in the guide rail 44. The encoder sensor 38A is mounted on a lower surface of the carriage 23 at a position facing the encoder strip 38B. In the process of the carriage 23 moving, the encoder sensor 38A reads the encoder strip 38B to generate a pulse signal and outputs the generated pulse signal to the controller 130. The encoder sensor 38A and the encoder strip 38B configure a carriage sensor 38 (refer to FIG. 6).

[Media Sensor 122]

As depicted in FIG. 2, the media sensor 122 is mounted in the carriage 23 on the lower surface (a surface facing the platen 42) of the carriage 23. The media sensor 122 includes a light-emitting section configured from the likes of a light-emitting diode and a light-receiver configured from the likes of an optical sensor. The light-emitting section irradiates toward the platen 42 light of a light amount instructed by the controller 130. The light irradiated from the light-emitting section is reflected by the platen 42 or the sheet 12 supported by the platen 42, and the reflected light is received by the light-receiver. The media sensor 122 outputs to the controller 130 a detection signal based on a received light amount of the light-receiver. For example, the media sensor 122 outputs to the controller 130 a detection signal where the larger the received light amount is, the higher a level of the detection signal is.

[Platen 42]

As depicted in FIG. 2, the platen 42 is disposed between the conveyance roller section 54 and the discharge roller section 55 in the conveyance direction 16. The platen 42 is disposed facing the recording section 24 in the up-down direction 7. The platen 42 supports from below the sheet 12 conveyed by at least one of the conveyance roller section 54 and the discharge roller section 55. Optical reflectance of the platen 42 in the present embodiment is set lower than that of the sheet 12.

[Maintenance Mechanism 70]

As depicted in FIG. 3, the printer 11 further includes a maintenance mechanism 70. The maintenance mechanism 70 performs maintenance of the recording head 39. In more detail, the maintenance mechanism 70 executes a purge operation that sucks up ink or air in the nozzle 40 and foreign matter adhered to the nozzle surface. Moreover, the ink or air in the nozzle 40 and foreign matter adhered to the nozzle surface will be expressed below as ink, and so on. The ink, and so on, that has been sucked up and removed by the maintenance mechanism 70 is stored in a liquid discharge tank 74 (refer to FIG. 4A).

As depicted in FIG. 3, the maintenance mechanism 70 is disposed in a position displaced to one side (rightwards) in the scanning direction from a sheet facing area. The sheet facing area refers to an area in the scanning direction where the sheet 12 conveyed by the conveyor, and the carriage 23, are able to face each other. As depicted in FIG. 4A, the maintenance mechanism 70 includes a cap 71, a tube 72, and a pump 73.

The cap 71 is configured by rubber. The cap 71 is disposed at a position that faces the recording head 39 of the carriage 23 when the carriage 23 is positioned in a second position displaced rightwards in the scanning direction from the sheet facing area. The tube 72 reaches from the cap 71 to the liquid discharge tank 74 via the pump 73. The pump 73 is, for example, a rotary type tube pump. The pump 73 is driven by the conveyance motor 102 to suck up the ink, and so on, in the nozzle 40 via the cap 71 and the tube 72 and discharge it to the liquid discharge tank 74 via the tube 72.

The cap 71 is, for example, configured capable of moving between a covering position and a separated position that are separated in the up-down direction 7 by using a cap shifter 71A (refer to FIG. 6). The cap 71 in the covering position closely contacts the recording head 39 of the carriage 23 in the second position, thereby covering the nozzle surface. On the other hand, the cap 71 in the separated position is separated from the nozzle surface. The cap 71 moves between the covering position and the separated position by means of a cap shifter 71A driven by the feed motor 101. However, a specific configuration for causing the recording head 39 and the cap 71 to contact/separate is not limited to that of the previously mentioned example.

As another example, the cap 71, instead of being moved by the cap shifter 71A driven by the feed motor 101, may be moved by an unillustrated link mechanism that operates in conjunction with movement of the carriage 23. The link mechanism is capable of posture change between a first posture in which the cap 71 is held in the covering position and a second posture in which the cap 71 is held in the separated position. Moreover, the link mechanism, for example, undergoes posture change from the second posture to the first posture by being abutted on by the carriage 23 moving toward the second position. On the other hand, the link mechanism, for example, undergoes posture change from the first posture to the second posture by being moved away from by the carriage 23 moving toward a first position.

As another example, the multifunction peripheral 10 may include a cap shifter that moves the guide rails 43, 44 in the up-down direction 7, instead of the cap shifter 71A that moves the cap 71. That is, the carriage 23 in the second position is raised/lowered along with the guide rails 43, 44 that are raised/lowered by the cap shifter. On the other hand, the cap 71 is fixed in a position facing the recording head 39 of the carriage 23 in the second position. Moreover, by the guide rails 43, 44 and the carriage 23 being lowered to a certain position by the cap shifter, the nozzle surface of the recording head 39 is covered by the cap 71. Moreover, by the guide rails 43, 44 and the carriage 23 being raised to a certain position by the cap shifter, the recording head 39 and the cap 71 separate and the carriage 23 becomes movable in the scanning direction.

As yet another example, the multifunction peripheral 10 may include both of the cap shifter 71A that moves the cap 71 and the cap shifter that moves the guide rails 43, 44. Then, by the carriage 23 and the cap 71 being moved in an orientation causing them to approach each other, the cap 71 may be caused to closely contact the nozzle surface. Furthermore, by the carriage 23 and the cap 71 being moved in an orientation causing them to separate from each other, the cap 71 may be caused to separate from the nozzle surface. That is, the previously mentioned covering position and separated position refer to relative positions of the recording head 39 and the cap 71. Moreover, all that is required is to change the relative positions of the recording head 39 and the cap 71 by moving one or both of the recording head 39 and the cap 71. In other words, all that is required is to change the relative positions of the recording head 39 and the cap 71 by moving the recording head 39 and the cap 71 relatively.

[Cap Sensor 123]

A cap sensor 123 outputs different detection signals depending on whether the cap 71 is in the covering position or not. The cap sensor 123 outputs a high level signal to the controller 130 based on the cap 71 being in the covering position. On the other hand, the cap sensor 123 outputs a low level signal to the controller 130 based on the cap 71 being in a position different from the covering position. Note that when the cap 71 has been moved from the covering position to the separated position, the detection signal outputted from the cap sensor 123 changes from the high level signal to the low level signal before the cap 71 reaches the separated position.

[Ink Receiver 75]

As depicted in FIG. 3, the printer 11 further includes an ink receiver 75. The ink receiver 75 is disposed in a position displaced to the other side (leftwards) in the scanning direction from the sheet facing area. In more detail, the ink receiver 75 is disposed in a position that faces the recording head 39 of the carriage 23 when the carriage 23 is positioned in the first position displaced leftwards in the scanning direction from the sheet facing area. Note that the maintenance mechanism 70 and the ink receiver 75 may be provided on the same side in the scanning direction from the sheet facing area. However, the first position and the second position are positions separated in the scanning direction.

Figure 4B:
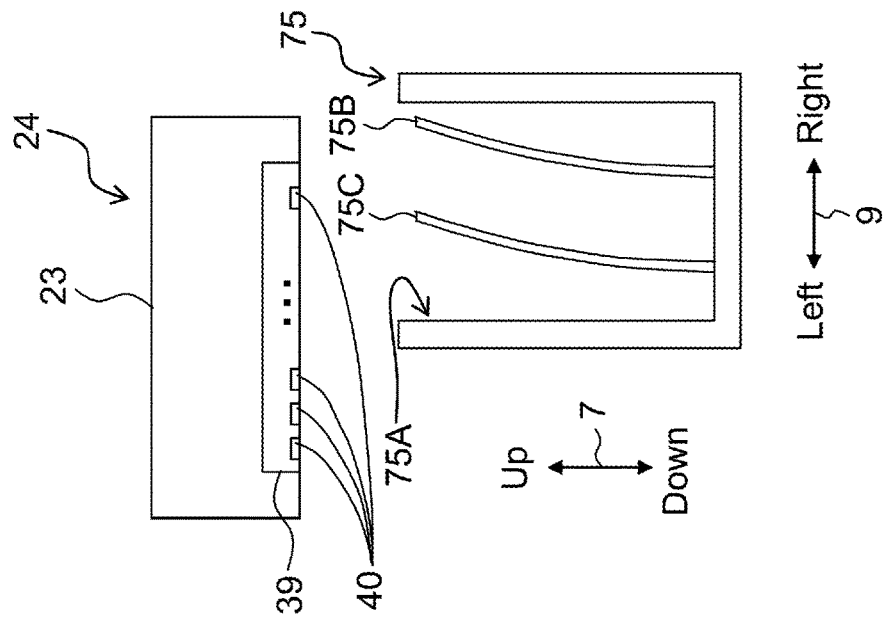
FIG. 4B depicts a schematic configuration diagram of an ink receiver 75.
Figure 4A:
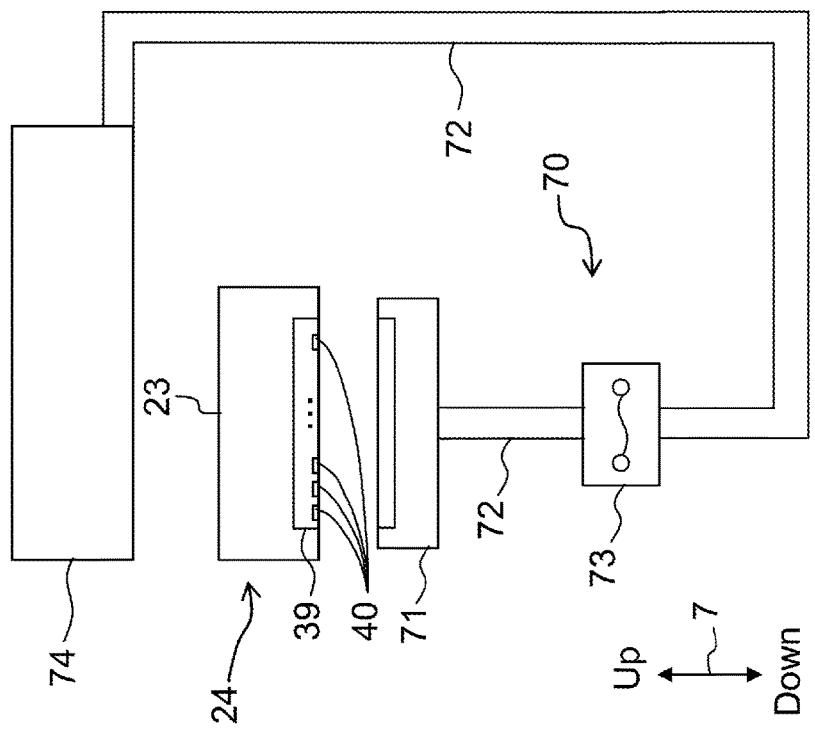
FIG. 4A depicts a schematic configuration diagram of a maintenance mechanism 70.

As depicted in FIG. 4B, the ink receiver 75 has roughly a rectangular parallelepiped box shape with an opening 75A formed on its upper surface. A width of the opening 75A in the scanning direction is shorter than a width of the nozzle surface in the scanning direction. Moreover, guide plates 75B, 75C are provided on the inside of the ink receiver 75 at positions separated in the left-right direction 9. The guide plates 75B, 75C are plate-like members extending in the up-down direction 7 and the front-rear direction 8. Moreover, the guide plates 75B, 75C are provided inclined in the left-right direction 9. In more detail, the guide plates 75B, 75C are disposed inside the ink receiver 75 such that left surfaces of the guide plates 75B, 75C face obliquely upward left. The guide plates 75B, 75C guide ink discharged from the recording head 39 toward an interior surface (bottom surface) of the ink receiver 75. However, the number of guide plates 75B, 75C is not limited to two.

[Drive Force Transmitting Mechanism 80]

As depicted in FIG. 6, the printer 11 further includes a drive force transmitting mechanism 80. The drive force transmitting mechanism 80 transmits a drive force of the feed motor 101 and the conveyance motor 102 to the feed rollers 25A, 25B, the conveyance roller 60, the discharge roller 62, the cap shifter 71A of the cap 71, and the pump 73. The drive force transmitting mechanism 80 is configured by combining all or some of the likes of a gear wheel, a pulley, an endless annular belt, a planetary gear mechanism (pendulum gear mechanism), and a one-way clutch. Moreover, the drive force transmitting mechanism 80 includes a switching mechanism 170 (refer to FIG. 5) that switches a transmission destination of the drive force of the feed motor 101 and the conveyance motor 102.

[Switching Mechanism 170]

As depicted in FIG. 3, the switching mechanism 170 is disposed in a position displaced to the one side in the scanning direction from the sheet facing area. Moreover, the switching mechanism 170 is disposed below the guide rail 43. As depicted in FIG. 5, the switching mechanism 170 includes a slide member 171, drive gears 172, 173, driven gears 174, 175, 176, 177, a lever 178, and springs 179, 180 that are examples of a biasing member. The switching mechanism 170 is configured switchable to a first state, a second state, and a third state.

The first state is a state where the drive force of the feed motor 101 is transmitted to the feed roller 25A, but is not transmitted to the feed roller 25B and the cap shifter 71A of the cap 71. The second state is a state where the drive force of the feed motor 101 is transmitted to the feed roller 25B, but is not transmitted to the feed roller 25A and the cap shifter 71A of the cap 71. The third state is a state where the drive force of the feed motor 101 is transmitted to the cap shifter 71A of the cap 71, but is not transmitted to the feed rollers 25A, 25B. Moreover, the first state and the second state are states where the drive force of the conveyance motor 102 is transmitted to the conveyance roller 60 and the discharge roller 62, but is not transmitted to the pump 73. The second state is a state where the drive force of the conveyance motor 102 is transmitted to all of the conveyance roller 60, the discharge roller 62, and the pump 73.

The slide member 171 is a roughly circular column shaped member supported by a support shaft (indicated by broken lines in FIG. 5) extending in the left-right direction 9. Moreover, the slide member 171 is configured to be slidable in the left-right direction 9 along the support shaft. Furthermore, the slide member 171 supports the drive gears 172, 173 in a state of each being independently rotatable, at positions displaced in the left-right direction 9 on an outer surface of the slide member 171. That is, the slide member 171 and the drive gears 172, 173 slide in the left-right direction 9 as one united body.

Figure 5A:
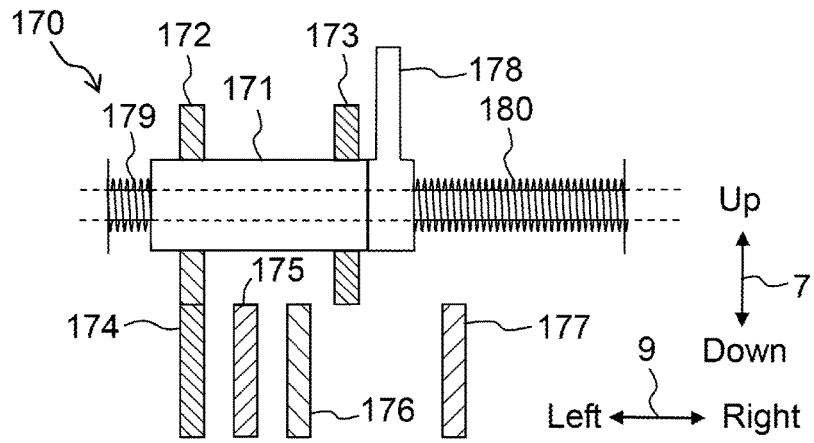
FIGS. 5A to 5C depict schematic configuration diagrams of a switching mechanism 170, FIG. 5A depicting a first state, FIG. 5B depicting a second state, and FIG. 5C depicting a third state.
Figure 5B:
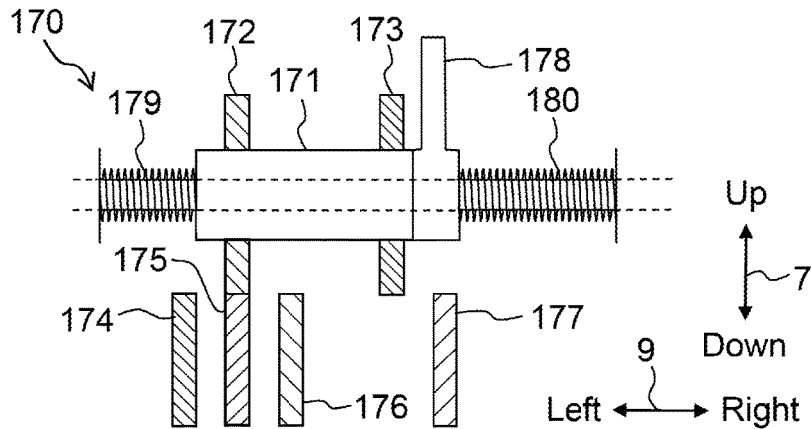
Figure 5C:
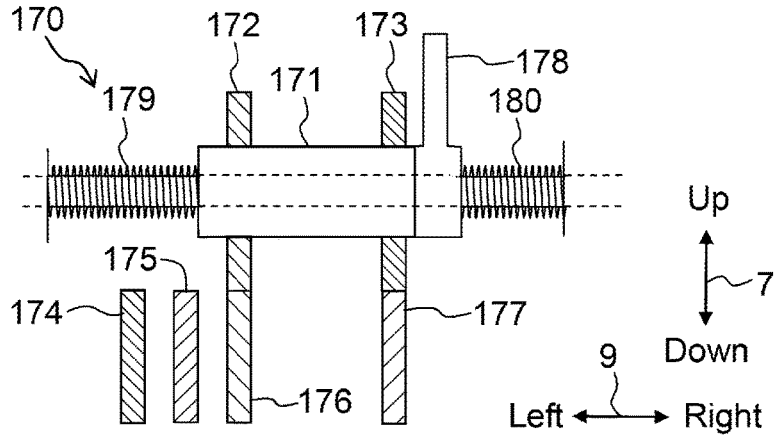

The drive gear 172 rotates by the rotational drive force of the feed motor 101 being transmitted thereto. The drive gear 172 meshes with one of the driven gears 174, 175, 176. In more detail, when the switching mechanism 170 is in the first state, the drive gear 172 meshes with the driven gear 174 as depicted in FIG. 5A. In addition, when the switching mechanism 170 is in the second state, the drive gear 172 meshes with the driven gear 175 as depicted in FIG. 5B. Furthermore, when the switching mechanism 170 is in the third state, the drive gear 172 meshes with the driven gear 176 as depicted in FIG. 5C.

The drive gear 173 rotates by the rotational drive force of the conveyance motor 102 being transmitted thereto. When the switching mechanism 170 is in the first state and the second state, meshing of the drive gear 173 with the driven gear 176 is released as depicted in FIGS. 5A and 5B. Moreover, when the switching mechanism 170 is in the third state, the drive gear 173 meshes with the driven gear 177 as depicted in FIG. 5C.

The driven gear 174 meshes with a gear train rotating the feed roller 25A. That is, meshing of the drive gear 172 and the driven gear 174 results in the rotational drive force of the feed motor 101 being transmitted to the feed roller 25A. Moreover, release of meshing of the drive gear 172 and the driven gear 174 results in the rotational drive force of the feed motor 101 failing to be transmitted to the feed roller 25A.

The driven gear 175 meshes with a gear train rotating the feed roller 25B. That is, meshing of the drive gear 172 and the driven gear 175 results in the rotational drive force of the feed motor 101 being transmitted to the feed roller 25B. Moreover, release of meshing of the drive gear 172 and the driven gear 175 results in the rotational drive force of the feed motor 101 failing to be transmitted to the feed roller 25B.

The driven gear 176 meshes with a gear train driving the cap shifter 71A of the cap 71. That is, meshing of the drive gear 172 and the driven gear 176 results in the rotational drive force of the feed motor 101 being transmitted to the cap shifter 71A of the cap 71. Moreover, release of meshing of the drive gear 172 and the driven gear 176 results in the rotational drive force of the feed motor 101 failing to be transmitted to the cap shifter 71A of the cap 71.

The driven gear 177 meshes with a gear train driving the pump 73. That is, meshing of the drive gear 173 and the driven gear 177 results in the rotational drive force of the conveyance motor 102 being transmitted to the pump 73. Moreover, release of meshing of the drive gear 173 and the driven gear 177 results in the rotational drive force of the conveyance motor 102 failing to be transmitted to the pump 73. On the other hand, the rotational drive force of the conveyance motor 102 is transmitted to the conveyance roller 60 and the discharge roller 62 without intervention of the switching mechanism 170. That is, the conveyance roller 60 and the discharge roller 62 rotate by the rotational drive force of the conveyance motor 102, regardless of the state of the switching mechanism 170.

The lever 178 is supported by the supporting shaft at a position adjacent on the right to the slide member 171. In addition, the lever 178 slides in the left-right direction 9 along the supporting shaft. Furthermore, the lever 178 projects upwardly. Moreover, a tip of the lever 178 reaches to a position where it can be abutted on by the carriage 23, via an opening 43A provided in the guide rail 43. The lever 178 slides in the left-right direction 9 by being abutted on and moved away from by the carriage 23. Moreover, the switching mechanism 170 includes a plurality of locking sections that lock the lever 178. Moreover, the lever 178 that has been locked in the locking section can stay in its position, even after having been moved away from by the carriage 23.

The springs 179, 180 are supported by the supporting shaft. One end (a left end) of the spring 179 abuts on the frame of the printer 11, and the other end (a right end) of the spring 179 abuts on a left end surface of the slide member 171. That is, the spring 179 biases in a rightward orientation the slide member 171 and the lever 178 abutting on the slide member 171. One end (a right end) of the spring 180 abuts on the frame of the printer 11, and the other end (a left end) of the spring 180 abuts on a right end surface of the lever 178. That is, the spring 180 biases in a leftward orientation the lever 178 and the slide member 171 abutting on the lever 178. Furthermore, a biasing force of the spring 180 is larger than a biasing force of the spring 179.

When the lever 178 is locked in a first locking section, the switching mechanism 170 is in the first state. Moreover, the lever 178 pressed on by the carriage 23 moving in the rightward orientation opposes the biasing force of the spring 180 to move in the rightward orientation and be locked in a second locking section positioned rightwards of the first locking section. As a result, the slide member 171 moves in the rightward orientation following movement of the lever 178, due to the biasing force of the spring 179. As a result, the switching mechanism 170 is switched from the first state depicted in FIG. 5A to the second state depicted in FIG. 5B. That is, the switching mechanism 170 is switched from the first state to the second state by the lever 178 being abutted on by the carriage 23 heading from the first position to the second position.

In addition, the lever 178 pressed on by the carriage 23 moving to the second position opposes the biasing force of the spring 180 to move in the rightward orientation and be locked in a third locking section positioned even more rightwards than the second locking section. As a result, the slide member 171 moves in the rightward orientation following movement of the lever 178, due to the biasing force of the spring 179. As a result, the switching mechanism 170 is switched from the first state depicted in FIG. 5A or the second state depicted in FIG. 5B to the third state depicted in FIG. 5C. That is, the switching mechanism 170 is switched to the third state by the lever 178 being abutted on by the carriage 23 moving to the second position.

Furthermore, locking due to the third locking section, of the lever 178 that has been pressed on by the carriage 23 moving even more rightwards than the second position and then moved away from by the carriage 23 moving in the leftward orientation, is released. As a result, the slide member 171 and the lever 178 are moved in the leftward orientation by the biasing force of the spring 180. Then, the lever 178 is locked in the first locking section. As a result, the switching mechanism 170 is switched from the third state depicted in FIG. 5C to the first state depicted in FIG. 5A. That is, the switching mechanism 170 is switched from the third state to the first state by the lever 178 being abutted on and moved away from by the carriage 23 moving from the second position to the first position.

That is, the state of the switching mechanism 170 is switched by abutting/separation of the carriage 23 on/from the lever 178. In other words, the transmission destinations of the drive forces of the feed motor 101 and the conveyance motor 102 are switched by the carriage 23. Note that the state of the switching mechanism 170 according to the present embodiment cannot be switched directly from the third state to the second state, and as previously mentioned, is required to be switched from the third state to the first state and further switched from the first state to the second state.

[Power Supply Section 110]

As depicted in FIG. 6, the multifunction peripheral 10 has a power supply section 110. The power supply section 110 supplies each configuring element of the multifunction peripheral 10 with electric power supplied from an external power supply via a power supply plug. In more detail, the power supply section 110 outputs electric power acquired from the external power supply to each of the motors 101-103 and the recording head 39 as drive electric power (for example, 24 to 26 V), and to the controller 130 as control electric power (for example, 5 V).

Moreover, the power supply section 110 is capable of switching between a drive state and a sleep state, based on a power supply signal outputted from the controller 130. In more detail, the controller 130 switches the power supply section 110 from the sleep state to the drive state by outputting a HIGH level power supply signal (for example, 5 V). Moreover, the controller 130 switches the power supply section 110 from the drive state to the sleep state by outputting a LOW level power supply signal (for example, 0 V).

The drive state is a state where drive electric power is being outputted to the motors 101-103 and the recording head 39. In other words, the drive state is a state where the motors 101-103 and the recording head 39 are operable. The sleep state is a state where drive electric power is not being outputted to the motors 101-103 and the recording head 39. In other words, the sleep state is a state where the motors 101-103 and the recording head 39 are inoperable. On the other hand, although illustration of this is omitted, the power supply section 110 outputs control electric power to a controller 30 and a communication part 50, regardless of whether the power supply section 110 is in the drive state or in the sleep state.

[Controller 130]

As depicted in FIG. 6, the controller 130 includes a CPU 131, a ROM 132, a RAM 133, an EEPROM 134, and an ASIC 135, and these are connected by an internal bus 137. The ROM 132 stores the likes of a program for the CPU 131 to control various kinds of operations. The RAM 133 is used as a storage area for temporarily recording the likes of data or a signal employed when the CPU 131 executes the above-described program, or as a work area of data processing. The EEPROM 134 stores setting information that should be held even after the power supply is turned off.

In the present embodiment, the EEPROM 134 stores time information indicating a time (hereafter, described as "FLS execution time") when a later-mentioned flushing process was most recently executed. The controller 130 acquires the time information from a system clock (not illustrated) at an execution time of the flushing process, and stores the acquired time information in the EEPROM 134 as time information. In addition, the controller 130, based on there being time information already stored in the EEPROM 134, overwrites the time information that has already been stored with new time information.

The feed motor 101, the conveyance motor 102, and the carriage motor 103 are connected to the ASIC 135. The ASIC 135 generates a drive signal for rotating each of the motors, and outputs the generated drive signal to each of the motors. Each of the motors is forward rotationally driven or reverse rotationally driven based on the drive signal from the ASIC 135. Moreover, the controller 130 causes ink to be discharged from the nozzle 40 by applying a drive voltage of the power supply section 110 to the vibrating element of the recording head 39.

Moreover, the communication part 50 is connected to the ASIC 135. The communication part 50 is a communication interface capable of communicating with an information processing apparatus 51. That is, the controller 130 outputs various kinds of information to the information processing apparatus 51 via the communication part 50, and receives various kinds of information from the information processing apparatus 51 via the communication part 50. The communication part 50 may transmit and receive a wireless signal by a communication protocol based on Wi-Fi (registered trademark of Wi-Fi Alliance), for example, or may be an interface to which a LAN cable or USB cable is connected. Note that in FIG. 6, the information processing apparatus 51 is surrounded by a dotted line frame, thereby distinguishing it from configuring elements of the multifunction peripheral 10.

Furthermore, the resist sensor 120, the rotary encoder 121, the carriage sensor 38, the media sensor 122, and the cap sensor 123 are connected to the ASIC 135. The controller 130 detects a position of the sheet 12, based on the detection signal outputted from the resist sensor 120 and the pulse signal outputted from the rotary encoder 121. In addition, the controller 130 detects a position of the carriage 23, based on the pulse signal outputted from the carriage sensor 38. Moreover, the controller 130 detects a position of the cap 71, based on the detection signal outputted from the cap sensor 123.

Furthermore, the controller 130 detects the sheet 12 that has been conveyed by the conveyor, based on the detection signal outputted from the media sensor 122. In more detail, the controller 130 compares an amount of change in signal level of temporally adjacent detection signals and a predetermined threshold value. Then, the controller 130, based on the amount of change in signal level having attained the threshold value or more, detects that a leading edge of the sheet 12 has reached a position facing the media sensor 122 in the up-down direction 7.

[Image Recording Process]

Next, an image recording process of the present embodiment will be described with reference to FIGS. 7 to 10. The multifunction peripheral 10 begins the image recording process based on having received a command from the information processing apparatus 51 via the communication part 50. Note that at a start time point of the image recording process, the carriage 23 is assumed to be positioned in the second position, the cap 71 is assumed to be positioned in the covering position, and the switching mechanism 170 is assumed to be in the third state. Each of the processes below may be executed by the CPU 131 reading the program stored in the ROM 132, or may be achieved by a hardware circuit mounted in the controller 130. Moreover, an execution sequence of each of the processes may be appropriately changed in a range that does not alter the gist of the present teaching.

First, although illustration of this is omitted, the information processing apparatus 51, based on, for example, having received from a user an instruction to make the multifunction peripheral 10 execute the image recording process, transmits a preceding command to the multifunction peripheral 10. The preceding command is a command that gives prior notice of transmission of a later-mentioned recording command. Next, the information processing apparatus 51, based on having transmitted the preceding command, converts to raster data image data designated by the user. Then, the information processing apparatus 51, based on having generated the raster data, transmits the recording command to the multifunction peripheral 10. The recording command is a command to record on the sheet the image indicated by the raster data.

The controller 130, based on having received the preceding command from the information processing apparatus 51 via the communication part 50 (S11: Preceding Command), executes an FLS condition determining process (S12). The FLS condition determining process is an example of a determining process for determining execution conditions of the flushing process. Details of the FLS condition determining process will be described with reference to FIG. 8.

[FLS Condition Determining Process]

First, the controller 130 acquires time information indicating a current time, from the system clock. Then, the controller 130 calculates a difference between the FLS execution time indicated by the time information stored in the EEPROM 134 and the current time, as an elapsed time T from the flushing process being most recently executed to the preceding command being received. This process is an example of a measurement process. However, a method of measuring the elapsed time T is not limited to the previously mentioned example. Then, the controller 130 compares the elapsed time T and threshold times $T_1$, $T_2$, $T_3$ (S21 to S23). The threshold times $T_1$, $T_2$, $T_3$ are values pre-stored in the EEPROM 134, and for the threshold times, it holds that $T_1 < T_2 < T_3$.

Next, the controller 130, based on the elapsed time T being less than the threshold time $T_1$ (S21: Yes), determines an FLS shot number to be 50, determines a CR speed to be 60 ips, determines an FLS voltage to be 24V, and determines an FLS number-of-times to be one (S24 to S27). The FLS shot number is the total number of ink droplets (that is, an ink amount) discharged from each of the nozzles 40 in the flushing process. The CR speed is a movement speed of the carriage 23 in the flushing process. The FLS voltage is a drive voltage applied to the recording head in the flushing process. The FLS number-of-times is the number of times of flushing processes. The FLS shot number, the CR speed, the FLS voltage, and the FLS number-of-times are an example of execution conditions of the flushing process.

In addition, the controller 130, based on the elapsed time T being $T_1$ or more and less than $T_2$ (S22: Yes), determines the FLS shot number to be 300, determines the CR speed to be 4 ips, determines the FLS voltage to be 24V, and determines the FLS number-of-times to be one (S28 to S31). Moreover, the controller 130, based on the elapsed time T being $T_2$ or more and less than $T_3$ (S23: Yes), determines the FLS shot number to be 600, determines the CR speed to be 4 ips, determines the FLS voltage to be 26V, and determines the FLS number-of-times to be one (S32 to S35). Furthermore, the controller 130, based on the elapsed time T being $T_3$ or more (S23: No), determines the FLS shot number to be 1800, determines the CR speed to be 4 ips, determines the FLS voltage to be 26V, and determines the FLS number-of-times to be three (S36 to S39).

That is, the controller 130 sets the FLS shot number, the CR speed, the FLS voltage, and the FLS number-of-times such that the longer the elapsed time T is, the larger the FLS shot number is set, the slower the CR speed is set, the higher the FLS voltage is set, and the larger the FLS number-of-times is set. In other words, the controller 130 sets the CR speed, the FLS voltage, and the FLS number-of-times such that the larger the FLS shot number is, the slower the CR speed is set, the higher the FLS voltage is set, and the larger the FLS number-of-times is set. An FLS shot number of between 600 and 1800 (for example, 1000) is an example of a first threshold value, an FLS shot number of between 50 and 300 (for example, 100) is an example of a second threshold value, and an FLS shot number of between 300 and 600 (for example, 400) is an example of a third threshold value. That is, in the present embodiment, the second threshold value is smaller than the third threshold value, and the third threshold value is smaller than the first threshold value. However, a magnitude relationship of the first threshold value, the second threshold value, and the third threshold is not limited to the previously mentioned example.

In addition, CR speed=60 ips is an example of a first speed, and CR speed=4 ips is an example of a second speed. That is, the second speed is slower than the first speed. Moreover, FLS voltage=24 V is an example of a first voltage, and FLS voltage=26 V is an example of a second voltage. That is, the second voltage is higher than the first voltage. Note that a drive voltage in a later-mentioned recording process is set to the first voltage. Furthermore, FLS number-of-times=1 is an example of α times, and FLS number-of-times=3 is an example of β times. That is, α<β. However, specific numerical values of CR speed, FLS voltage, and FLS number-of-times are not limited to the previously mentioned example.

Figure 9:
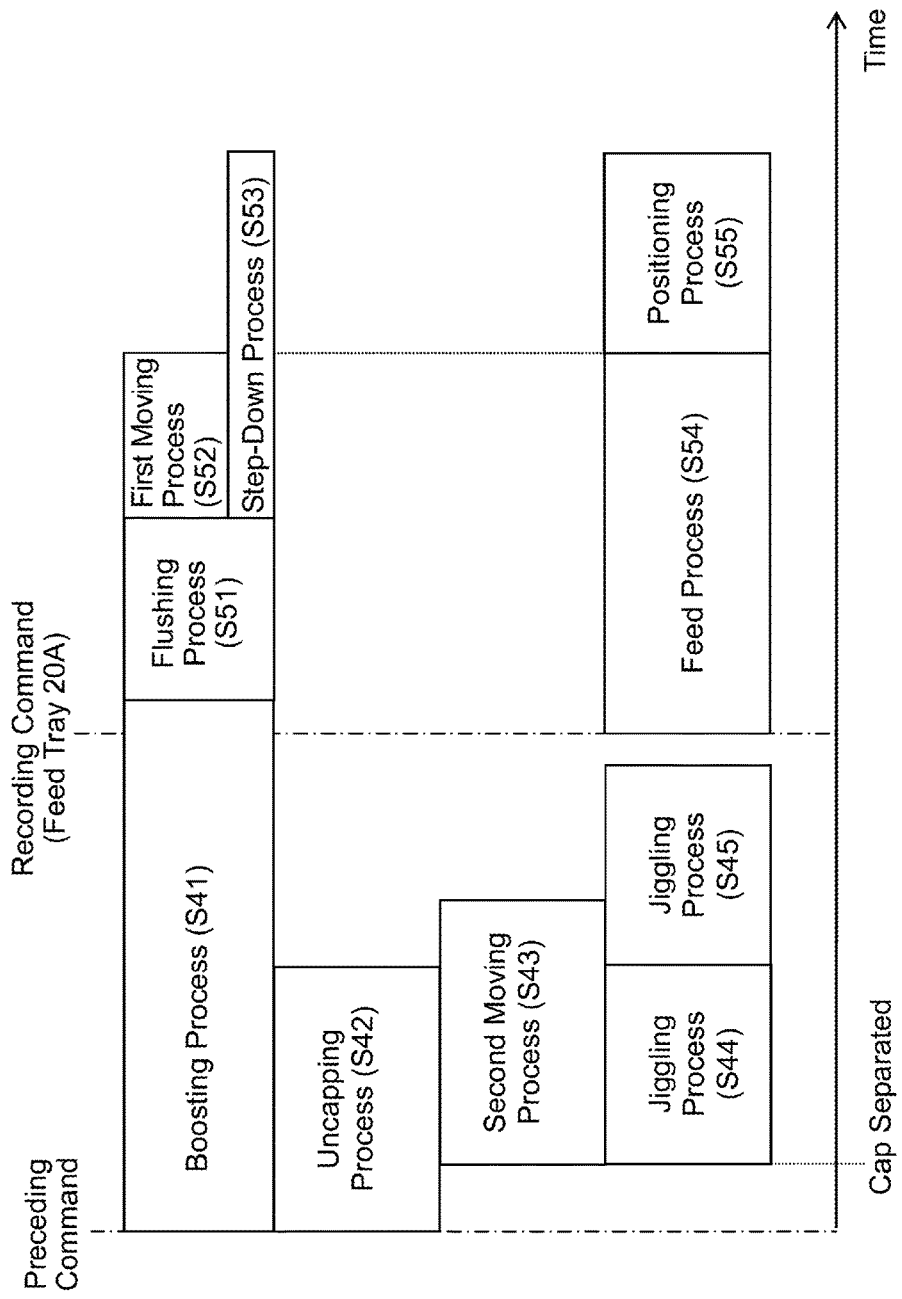
FIG. 9 depicts a timing chart showing execution timings of a first preparation process and a second preparation process.

Returning to FIG. 7, the controller 130 executes a first preparation process (S13). That is, the preceding command may be expressed in other words as a command that instructs execution of the first preparation process. The first preparation process is a process for putting the printer 11 in a state enabling execution of the recording process. A "state enabling execution of the recording process" may be described in other words as a state enabling an image of not less than a certain quality to be recorded. As depicted in FIG. 9, for example, the first preparation process includes a boosting process (S41), an uncapping process (S42), a second moving process (S43), and a jiggling process (S44, S45).

The boosting process (S41) is a process in which the power supply section 110 boosts a drive voltage supplied to each of configuring elements of the printer 11, to an FLS voltage $V_F$ determined by the FLS condition determining process. The power supply section 110, for example, boosts a power supply voltage supplied from an external power supply, to the FLS voltage $V_F$, by an unillustrated regulator circuit. Boosting the power supply section 110 refers to, for example, storing a charge in an unillustrated storage element such as a condenser. Furthermore, after a charge corresponding to the FLS voltage $V_F$ has been stored in the storage element, the regulator circuit continues to apply the storage element with a voltage for maintaining the drive voltage.

However, when the drive voltage is suddenly boosted, there is a possibility that the drive voltage during boosting becomes unstable. Accordingly, the controller 130 boosts the drive voltage to a check voltage $V_1$ by, for example, feedback control. Next, the controller 130, based on the drive voltage having reached the check voltage $V_1$, boosts the drive voltage to a check voltage $V_2$ by feedback control. In this way, boosting is performed gradually by repeating a plurality of boosting steps. That is, $V_1<V_2<\ldots<V_F$. As a result, fluctuation of the drive voltage during boosting is suppressed.

Note that the closer the check voltages $V_1, V_2, \ldots$ come to the FLS voltage $V_F$, the more finely they are set. As an example, when the FLS voltage $V_F$=24 V, the check voltages are set to 20 V, 22 V, 23 V, 23.5 V, 23.75 V. As another example, when the FLS voltage $V_F$=26 V, the check voltages are set to 20 V, 24 V, 25 V, 25.5 V, 25.75 V. Moreover, since a majority of processing time of the boosting process is occupied by feedback control after the drive voltage has come close to the FLS voltage $V_F$, no great difference occurs in execution time of the boosting process, whichever of 24V, 26 V the FLS voltage $V_F$ is.

In addition, the controller 130 may execute the boosting process in a state where the drive voltage has been applied to the recording head 39 by the power supply section 110. A "state where the drive voltage has been applied to the recording head 39" refers to a state where, for example, the drive voltage during boosting is applied to the vibrating element of the recording head 39 by setting to a conductive state a switch element of a circuit from the power supply section 110 to the recording head 39. In other words, it may also be expressed as a state where ink is discharged from the nozzle 40 when the drive voltage during boosting has reached 24 V. As a result, fluctuation of the drive voltage during boosting can be further suppressed for the following reason.

First, generally, when a voltage applied to a circuit fluctuates, a rise time and a fall time of a voltage waveform become longer the larger a resistance component in said circuit is. That is, the larger the resistance component is, the smaller a change in voltage per unit time becomes. Moreover, in the circuit from the power supply section 110 to the vibrating element of the recording head 39, there exist resistance components of a transistor configuring the switch element, an output section outputting a drive signal, and so on. Accordingly, if from the power supply section 110 to the recording head 39 is configured as one circuit, then fluctuation of the drive voltage during boosting can be more attenuated compared to when a break is made between the power supply section 110 and the recording head 39 to configure a single body circuit of the power supply section 110.

Moreover, a control circuit of the recording head 39 having the vibrating element can be regarded as a condenser having a certain electrostatic capacity. Moreover, this condenser repeats charging and discharging along with fluctuation of the applied drive voltage. As a result, since a high frequency component of voltage fluctuation can be removed, fluctuation of the drive voltage during boosting can be further attenuated.

Furthermore, the boosting process (S41) is typically executed at a timing when power supply of the multifunction peripheral 10 has been activated, or a timing when the power supply section 110 has been switched from the sleep state to the drive state. That is, when the drive voltage supplied by the power supply section 110 has already reached the FLS voltage $V_F$, the boosting process (S41) is sometimes omitted.

The uncapping process (S42) is a process in which the cap 71 is moved from the covering position to the separated position. That is, the controller 130 rotates the feed motor 101 to an extent of a predetermined rotation amount. Then, the rotational drive force of the feed motor 101 is transmitted to the cap shifter 71A via the switching mechanism 170 in the third state, whereby the cap 71 is moved from the covering position to the separated position. Moreover, the detection signal outputted from the cap sensor 123 changes from the high level signal to the low level signal before the cap 71 reaches the separated position, in other words, during execution of the uncapping process.

Figure 10A:
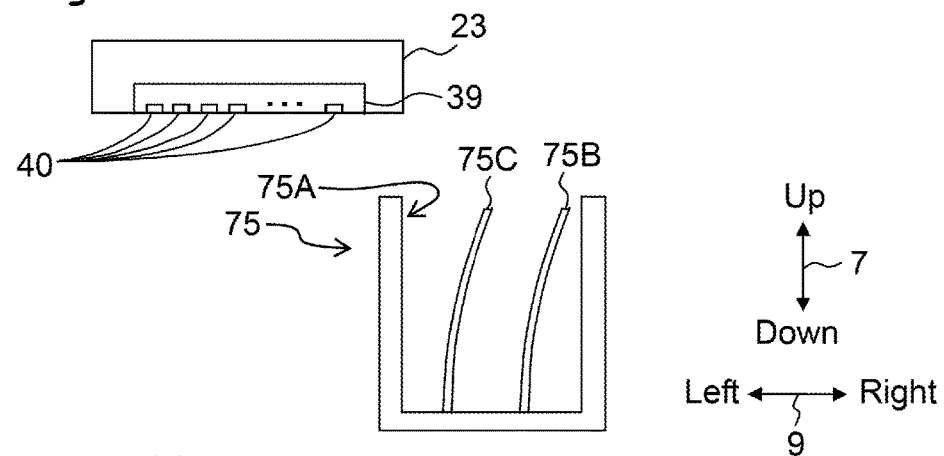
FIGS. 10A to 10C are views depicting a positional relationship of the carriage 23 and the ink receiver 75, FIG. 10A depicting a state where the carriage 23 is positioned leftwards of the ink receiver 75, FIG. 10B depicting a state where the carriage 23 is moving rightwards along a position facing the ink receiver 75, and FIG. 10C depicting a state where the carriage 23 is positioned rightwards of the ink receiver 75.
Figure 10B:
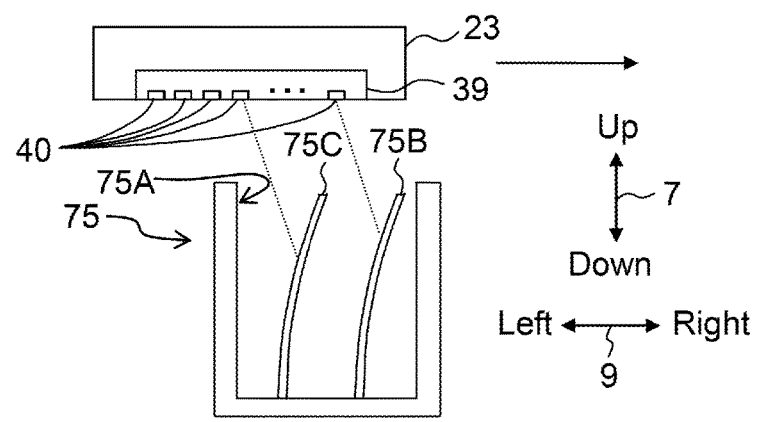

The second moving process (S43) includes a process in which the switching mechanism 170 is switched from the third state to the first state, and a process in which the carriage 23 that has been separated from the cap 71 is moved from the second position toward the first position. That is, the controller 130 moves the carriage 23 in the second position in the rightward orientation, and then moves it in the leftward orientation toward the first position. The controller 130, in step S43, causes the carriage 23 to reach a position leftward of the ink receiver 75, as depicted in FIG. 10A. Moreover, in order to suppress a meniscus of the ink formed in the nozzle 40 of the recording head 39 being destroyed, the controller 130 may execute the process of step S43 after moving the carriage 23 at low speed in the leftward orientation at a start time point of step S43.

The jiggling process (S44, S45) is a process in which at least one of the feed motor 101 and the conveyance motor 102 is forward/reverse rotated. In more detail, the controller 130 forward/reverse rotates both of the feed motor 101 and the conveyance motor 102 when the switching mechanism 170 is in the third state (S44). As a result, surface pressure between the drive gear 172 and the driven gear 176 and surface pressure between the drive gear 173 and the driven gear 177 are released, hence meshing of each of the gears is smoothly released. In addition, the controller 130 forward/reverse rotates the feed motor 101 when the switching mechanism 170 is switched to the first state (S45). As a result, the drive gear 172 and the driven gear 174 can be smoothly meshed. Note that the jiggling process may be only one of steps S44, S45.

Note that as depicted in FIG. 9, the controller 130 begins the processes of steps S41, S42 simultaneously, at a timing of having received the preceding command. That is, the controller 130 executes the processes of steps S41, S42 in parallel. In addition, the controller 130 begins steps S43, S44 simultaneously. That is, the controller 130 executes the processes of steps S43 to S45 in parallel. However, execution timings of each of steps S41 to S45 are not limited to the example of FIG. 9.

Furthermore, the controller 130 begins the process of step S43 at a timing when the detection signal of the cap sensor 123 has changed from the high level signal to the low level signal. That is, the controller 130 begins step S43 later than a start of steps S41, S42. In more detail, the controller 130 executes the process to move the carriage 23 at low speed in the leftward orientation and the process to move the carriage 23 rightwards of the second position, of step S43, in parallel with step S42. On the other hand, the controller 130 executes the process to move the carriage 23 in the leftward orientation toward the first position, of step S43, after finish of step S42.

Typically, the boosting process has the longest execution time among the plurality of processes (S41 to S45) included in the first preparation process. Accordingly, as depicted in FIG. 9, the controller 130 executes the process of step S41 and each of the processes of steps S42 to S45 in parallel. In other words, the controller 130 executes each of the processes of steps S42 to S45 at certain timings during execution of the process of step S41. Further rephrasing this, each of the processes of steps S42 to S45 are executed in parallel with the process of step S41.

Next, returning to FIG. 7, the controller 130, based on having received the recording command from the information processing apparatus 51 via the communication part 50 (S11: Recording Command), judges whether the first preparation process has finished or not (S14). That is, a receiving timing of the recording command is sometimes before finish of the first preparation process as depicted in FIG. 9, and is sometimes after finish of the first preparation process. The controller 130, based on having judged that the first preparation process has not yet finished (S14: No), holds execution of subsequent processes until the first preparation process finishes.

Then, the controller 130, based on having judged that the first preparation process has finished (S14: Yes), executes a second preparation process (S15). The second preparation process is a process not included in the first preparation process, of the process for putting the printer 11 in a state enabling execution of the recording process. As depicted in FIG. 9, for example, the second preparation process includes the flushing process (S51), a first moving processing (S52), a step-down process (S53), a feed process (S54), and a positioning process (S55).

The flushing process (S51) is a process in which the recording head 39 is caused to discharge ink toward the ink receiver 75, based on the execution conditions determined in the FLS condition determining process. That is, the controller 130, in step S51, in the process of moving the carriage 23 at the CR speed, applies the vibrating element with the FLS voltage $V_F$ to execute, to an extent of the FLS number-of-times, the flushing process causing the recording head 39 to discharge ink of the FLS shot number.

First, the controller 130, as a first time flushing process, moves the carriage 23 rightwards from the position depicted in FIG. 10A, and causes ink to be discharged from each of the nozzles 40 at a timing predetermined for each of the nozzles 40. Note that the carriage 23 accelerates to the CR speed from a standstill state and moves at constant speed at the CR speed, during a period of the flushing process. That is, the CR speed determined in the FLS condition determining process refers to a maximum speed or target speed of the carriage 23 in the flushing process.

A discharge timing of ink is predetermined such that ink impacts on target positions on the guide plates 75B, 75C. Discharge timing of each of the nozzles 40 is specified by the pulse signal outputted from the carriage sensor 38, for example. In the present embodiment, as depicted by the broken lines in FIG. 10B, for example, ink is discharged at an initial timing from the right end nozzle column discharging black ink and the right end nozzle column discharging cyan ink, and ink is discharged at a next timing from the nozzle column adjacent on the left to the nozzle column from which ink has been discharged. That is, the controller 130 causes ink to be discharged in sequence in the scanning direction (that is, in order from right to left) from each of the nozzles 40.

Moreover, when FLS number-of-times=1, in a single time flushing process, the FLS shot number of ink droplets are discharged from each of the nozzles 40. On the other hand, when FLS number-of-times=3, in a single time flushing process, ⅓ of the FLS shot number of ink droplets are discharged from each of the nozzles 40. In more detail, the controller 130, in a single time flushing process, causes each of the nozzles 40 to discharge (FLS shot number/FLS number-of-times) of ink. That is, the controller 130, when executing a plurality of times of the flushing processes in step S51, causes each of the nozzles 40 to discharge the FLS shot number of ink droplets dispersed in the plurality of flushing processes.

Figure 10C:
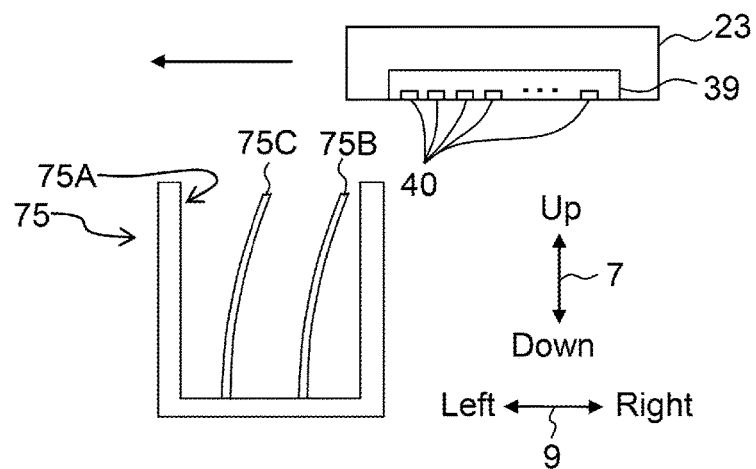

Next, when FLS number-of-times=3, the controller 130, after having caused ink to be discharged from all of the nozzles 40 in the first time flushing process, stops the carriage 23 at the position depicted in FIG. 10C. Then, the controller 130, as a second time flushing process, moves the carriage 23 leftwards from the position depicted in FIG. 10C, and causes ink to be discharged from each of the nozzles 40 at a timing predetermined for each of the nozzles 40. That is, in the second time flushing process, a movement orientation of the carriage 23 (leftward orientation) and an order of causing each of the nozzles 40 to discharge ink (that is, an order from left to right) is different from in the first time flushing process.

Furthermore, the controller 130, based on the second time flushing process having finished, executes a similar process to the first time flushing process, as a third time flushing process. That is, regardless of the FLS number-of-times determined in the FLS condition determining process, the controller 130, in a final flushing process, moves the carriage 23 in an orientation approaching the sheet facing area (that is, the rightward orientation).

Note that the controller 130 may further execute a non-discharge flushing process before the first time flushing process. The non-discharge flushing process is a process in which the vibrating element is vibrated to a degree insufficient for ink to be discharged from the nozzle 40. The non-discharge flushing process may be executed at any timing after finishing the boosting process. That is, the non-discharge flushing process may be started before the recording command is received. Moreover, execution time of the non-discharge flushing process may be set such that, for example, the longer the elapsed time T is, the longer the execution time is set. As a result, in the flushing process, ink becomes more easily discharged from the nozzle 40.

The first moving process (S52) is a process in which the carriage 23 is moved to a detection position. The detection position is a position that the sheet 12 of all sizes (for example, A4, B4, L-type, and so on) supportable by the feed trays 20A, 20B passes, of the sheet facing area. When the sheet 12 is supported by the feed trays 20A, 20B in a state where a center of the sheet 12 in the scanning direction has been positioned, the detection position may be a center of the sheet facing area in the scanning direction.

In the first time flushing process when FLS number-of-times=1 or in the third time flushing process when FLS number-of-times=3, the controller 130, based on ink having been discharged from all of the nozzles 40, causes the carriage 23 which is in motion to reach the detection position without stopping the carriage 23. As an example, the controller 130, in the case of having executed the flushing process at CR speed=60 ips, executes the first moving process without changing the speed of the carriage 23. As another example, the controller 130, in the case of having executed the flushing process at CR speed=4 ips, executes the first moving process accelerating the carriage 23 to 24 ips. CR speed=24 ips is an example of a third speed. However, a specific example of the third speed is not limited to the previously mentioned example, and, for example, may be identical to the first speed (60 ips).

The step-down process (S53) is a process in which the drive voltage is stepped down from the second voltage to the first voltage. That is, the controller 130, in the case of having boosted the drive voltage to the second voltage in step S41, executes the step-down process. On the other hand, the controller 130, in the case of having boosted the drive voltage to the first voltage in step S41, skips execution of the step-down process. The controller 130 causes the regulator circuit to stop application of the voltage to the storage element. As a result, the charge that has been stored in the storage element self-discharges. Then, the controller 130, based on the charge that has been stored in the storage element having attained the first voltage, causes the regulator circuit to continuously apply to the storage element a voltage for maintaining the drive voltage at the first voltage.

The feed process (S54) is a process in which the sheet 12 supported by the feed tray 20A is fed by the feed section 15A to a position where the sheet 12 reaches the conveyance roller section 54. This feed process is executed in the case that the recording command indicates the feed tray 20A as a feed source of the sheet 12. The controller 130 forwardly rotates the feed motor 101, and after the detection signal of the resist sensor 120 changes from the low level signal to the high level signal, further forwardly rotates the feed motor 101 to an extent of a predetermined rotation amount. Then, by the rotational drive force of the feed motor 101 being transmitted to the feed roller 25A via the switching mechanism 170 in the first state, the sheet supported by the feed tray 20A is fed to the conveyance path 65.

The positioning process (S55) is a process in which the sheet 12 that has been brought to the conveyance roller section 54 by the feed process is conveyed in the conveyance direction 16 by the conveyor to a position where an area on which an image will first be recorded (hereafter, sometimes described as "recording area") can face the recording head 39. An initial recording area on the sheet 12 is indicated in the recording command. The controller 130, by forwardly rotating the conveyance motor 102, detects a leading edge of the sheet 12 by the media sensor 122, and further causes the sheet 12 that has been brought to the conveyance roller section 54 to be conveyed by the conveyor until the initial recording area indicated in the recording command faces the recording head 39.

Note that each of the processes (S51 to S55) included in the second preparation process cannot be started until after at least some of the plurality of processes included in the first preparation process have finished. The flushing process cannot be started until after the boosting process, the uncapping process, and the second moving process have finished, but can be started even if the jiggling process has not finished. On the other hand, the feed process cannot be started until after the jiggling process has finished, but can be started even if the boosting process and the second moving process have not finished. Moreover, the first moving process cannot be started until after the flushing process has finished. Furthermore, the positioning process cannot be started until after the feed process and the first moving process have finished.

That is, the controller 130, based on having received the recording command and on the boosting process, the uncapping process, and the second moving process having finished (S11: Recording Command & S14: Yes), begins the flushing process. Then, the controller 130, based on the flushing process having finished, begins the first moving process and the step-down process. That is, the controller 130 executes the first moving process and the step-down process in parallel. Moreover, the controller 130, based on having received the recording command and on the jiggling process having finished (S11: Recording Command & S14: Yes), begins the feed process. Then, the controller 130, based on the feed process and the first moving process having finished, begins the positioning process.

Moreover, although illustration of this is omitted, in the case that the recording command indicates the feed tray 20B as a feed source of the sheet 12, the controller 130 switches the switching mechanism 170 from the first state to the second state, based on the flushing process having finished. That is, the controller 130 moves the carriage 23 which is in motion in the flushing process further in the rightward orientation, whereby the lever 178 locked in the first locking section is locked in the second locking section. Then, the controller 130, based on having switched the switching mechanism 170 to the second state, moves the carriage 23 to the detection position. Furthermore, the controller 130, based on having switched the switching mechanism 170 to the second state, begins the feed process to feed the sheet 12 supported by the feed tray 20B.

Returning again to FIG. 7, the controller 130, based on all of the processes included in the second preparation process having finished, executes the recording process in accordance with the received recording command (S16 to S19). The recording process includes, for example, a discharging process (S16) and a conveyance process (S18) that are alternately executed, and a discharge process (S19). The discharging process (S16) is a process in which the recording head 39 is caused to discharge ink onto the recording area of the sheet 12 faced by the recording head 39. The conveyance process (S18) is a process in which the conveyor is caused to convey the sheet 12 to an extent of a certain conveyance width along the conveyance direction 16. The discharge process (S19) is a process in which the discharge roller section 55 is caused to discharge to the discharge tray 21 the sheet 12 recorded with the image.

That is, the controller 130 moves the carriage 23 from one end to the other end of the sheet facing area and causes the recording head 39 to discharge an ink droplet at a timing indicated by the recording command (S16). Next, the controller 130, based on existence of an image that should be recorded on the next recording area (S17: No), causes the conveyor to convey the sheet 12 to a position where the next recording area is faced by the recording head 39 (S18). The controller 130 repeatedly executes the processes of steps S16 to S18 until an image is recorded on all of the recording areas (S17: No). The controller 130, based on an image having been recorded on all of the recording areas (S17: Yes), causes the discharge roller section 55 to discharge the sheet 12 to the discharge tray 21 (S19).

Moreover, although illustration of this is omitted, the controller 130, based on a certain time having elapsed after the recording process (S16 to S19) has finished, moves the carriage 23 to the second position, changes the switching mechanism 170 to the third state, and moves the cap 71 to the covering position. Furthermore, the controller 130, based on a certain time having elapsed after moving the cap 71 to the covering position, switches the power supply section 110 from the drive state to the sleep state, and executes a so-called discharge flushing process. The discharge flushing process is a process in which the regulator circuit is caused to stop application of the voltage to the storage element, and the drive voltage is applied to vibrate the vibrating element. As a result, the charge that has been stored in the storage element is instantaneously discharged. Moreover, even if ink has been discharged from the nozzle 40 due to vibration of the vibrating element, said ink impacts on the inside of the cap 71, hence contamination of the sheet facing area can be suppressed.

[Technical Effects of Present Embodiment]

In order to maintain image recording quality in the recording process, it is required that the longer the elapsed time T from the immediately preceding flushing process becomes, the larger the amount of ink that should be discharged in the next flushing process is set. Accordingly, as in the above-described embodiment, the longer the elapsed time T becomes (in other words, the larger the FLS shot number becomes), the slower the CR speed is set, the higher the FLS voltage is set, and the larger the FLS number-of-times is set. As a result, the ink required to maintain the image recording quality can be reliably discharged in the flushing process. Moreover, since the ink is discharged while moving the carriage 23 in the flushing process, FPOT can be reduced more compared to when the flushing process is executed in a state where the carriage 23 has been stopped.

Now, due to the CR speed being slowed, the ink amount dischargeable from each of the nozzles 40 in a single time flushing process increases. Moreover, in the final flushing process, the carriage 23 which is in motion is moved to the detection position without being stopped. Furthermore, when the flushing process has been executed at CR speed=4 ips, the first moving process is executed increasing the speed to CR speed=24 ips. As a result, execution time of the second preparation process can be further reduced.

Moreover, due to the FLS voltage being raised, a discharge interval of ink from each of the nozzles 40 can be shortened or large ink droplets can be discharged. Furthermore, when the FLS shot number is small, the flushing process is executed at the first voltage (24 V) which is the drive voltage during the recording process, hence the step-down process can be skipped. As a result, execution time of the second preparation process can be further reduced.

Furthermore, due to the FLS number-of-times being increased, the necessary ink amount can be dispersed in a plurality of times of flushing processes. As a result, elapsed time after ink being finally discharged can be smoothed between the nozzle 40 that initially discharged ink and the nozzle 40 that finally discharged ink. As a result, deterioration of image recording quality can be further suppressed. Moreover, when a plurality of times of flushing processes are executed in step S51, the ink amounts discharged in each of the flushing processes need not be equal.

As an example, the controller 130 may set the ink amount discharged in the final flushing process larger than the ink amount discharged in the flushing processes prior to the final flushing process. As a result, since much ink is discharged at a timing temporally close to the recording process, the recording process can be executed in a state where there is little deteriorated ink. That is, image recording quality can be appropriately maintained.

As another example, the controller 130 may set the ink amount discharged in the final flushing process smaller than the ink amount discharged in the flushing processes prior to the final flushing process. Furthermore, the controller 130 may set the movement speed of the carriage in the final flushing process faster than the movement speed of the carriage in the flushing processes prior to the final flushing process. As a result, a process following the flushing process (that is, the first moving process) can be promptly executed, hence FPOT can be further reduced.

Moreover, a combination of FLS numbers-of-times is not limited to $\alpha=1$, $\beta=3$, and may be, for example, $\alpha=2$, $\beta=4$. The first time flushing process in this case may be executed on the carriage 23 which is in motion leftwards in the second moving process. That is, the controller 130 may finish the boosting process and the non-discharge flushing process during execution of the second moving process and execute the first time flushing process at a timing when the carriage 23 has reached a certain position. Furthermore, in the flushing process when $\alpha \geq 2$, the controller 130 need only cause the recording head 39 to dispersedly discharge ink of the ink amount determined in the FLS condition determining process.

Moreover, the FLS number-of-times may be variable based on the elapsed time T or the FLS shot number. For example, the controller 130, in the FLS condition determining process, determines the FLS shot number to be 1800 and determines the FLS number-of-times $\beta$ to be 3 (or 4), based on the elapsed time T being $T_3$ or more and less than $T_4$. On the other hand, the controller 130 determines the FLS shot number to be 2400 and determines the FLS number-of-times to be 5 (or 6), based on the elapsed time T being $T_4$ or more. Note that $T_3<T_4$. That is, the controller 130 may set a value of β such that the longer the elapsed time T is or the larger the FLS shot number is, the larger the value of β is set.

Moreover, when boosting the power supply section 110 in a state where the drive voltage has been applied to the recording head 39, fluctuation of the drive voltage during boosting is suppressed. As a result, even if the number of boosting steps is reduced, it can be suppressed that the drive voltage exceeds the FLS voltage $V_F$. As a result, since execution time of the boosting process is reduced, execution time of the first preparation process overall is reduced. Furthermore, since there is a lowering of possibility of the drive voltage exceeding the FLS voltage $V_F$ whereby ink is discharged from the recording head 39, mistaken discharge of ink in the sheet facing area is suppressed, even if the boosting process and the second moving process are executed in parallel. Note that as another example of the boosting process, the controller 130 may execute the boosting process setting to a cut-off state the switch element of the circuit from the power supply section 110 to the recording head 39.

Moreover, in the step-down process according to the above-described embodiment, the drive voltage is stepped down by self-discharge of the storage element, hence even if the step-down process and the first moving process are executed in parallel, it can be suppressed that ink is mistakenly discharged onto the sheet facing area. Note that a specific example of the step-down process is not limited to the previously mentioned example, and the drive voltage may be stepped down by discharge flushing process, as when the power supply section 110 is switched from the drive state to the sleep state.

Note that the above-described embodiment described an example where together with increase in the FLS shot number, first, the CR speed, next, the FLS voltage, and finally, the FLS number-of-times, of the plurality of execution conditions of the flushing process, is changed. However, a change sequence of the execution conditions of the flushing process is not limited to the previously mentioned example. Moreover, the FLS shot number is not limited to being increased/decreased by the elapsed time T, and may be increased/decreased by another parameter. For example, image quality (for example, "fine", "draft") of the recording process may be designated by the user via an unillustrated operation panel. Then, the controller 130 may set the FLS shot number larger when high image quality "fine" has been designated than when low image quality "draft" has been designated.

Moreover, the controller 130 may change only some of the CR speed, the FLS voltage, and the FLS number-of-times, and set the remainder to a fixed value. For example, the width in the scanning direction of the ink receiver 75 may be set larger than the width in the scanning direction of the nozzle surface. Moreover, the controller 130 may execute the flushing process in a state where the carriage 23 has been stopped at a position facing the ink receiver 75. In this case, the controller 130 may fix CR speed=0 and FLS number-of-times=1, and change only the FLS voltage based on the elapsed time T or FLS shot number.

Moreover, due to the above-described embodiment, the drive voltage is boosted during movement of the cap 71 and the carriage 23, hence execution time of the first preparation process is reduced more compared to when the uncapping process, the second moving process, and the boosting process are executed in turn. By executing the uncapping process, the second moving process, and the boosting process included in the first preparation process at appropriate timings in this way, FPOT can be further reduced.

Moreover, due to the above-described embodiment, the first preparation process is executed adopting the preceding command as a trigger, hence FPOT can be reduced more compared to when the first preparation process is executed after receiving the recording command. Moreover, in the first preparation process, the uncapping process, the second moving process, and the jiggling process are executed in parallel with the boosting process, whereby execution time of the first preparation process can be reduced more compared to when each of the processes is executed in turn.

On the other hand, due to the above-described embodiment, the flushing process is executed after the recording command has been received, hence the standby time from the flushing process finishing to the recording process being started can be shortened. That is, deterioration of image recording quality due to ink in the nozzle drying, can be suppressed. By executing the first preparation process and the second preparation process at appropriate timings in this way, FPOT can be reduced and deterioration of image recording quality can be suppressed.

What is claimed is:

1. An ink-jet printer, comprising:
   a conveyor configured to convey a sheet in a conveyance direction;
   a carriage being movable in a scanning direction along a sheet facing area, the scanning direction intersecting the conveyance direction, and the sheet facing area facing the sheet conveyed by the conveyor;
   a recording head mounted on the carriage to discharge ink from a plurality of nozzles aligned in the scanning direction;
   an ink receiver disposed to face the recording head that is located at a first position displaced in the scanning direction from the sheet facing area;
   a command receiver; and
   a controller configured to control the conveyor, the carriage and the recording head to execute:
      determining an amount of ink to be discharged to the receiver by the recording head;
      performing a flushing process during which the carriage is moving toward an area facing the ink receiver and in which the ink of the determined ink amount is discharged from each of the plurality of the nozzles, under a condition that the command receiver receives a recording command which is an instruction to record an image on the sheet;
      performing a printing process, under a condition that the flushing process has finished;
      discharging the ink of the determined ink amount in α times of the flushing processes, under a condition that the determined ink amount is less than a first threshold value; and
      discharging the ink of the determined ink amount dispersed in β(β>α) times of the flushing processes, under a condition that the determined ink amount is not less than the first threshold value,
   wherein each of the flushing processes in the flushing processes of α times and β times is performed separately during a separate moving of the carriage in the scanning direction.

2. The inkjet printer according to claim 1, wherein
in the flushing process, the controller controls the recording head to discharge ink from each of the plurality of the nozzles in an arrangement order in the scanning direction.

3. The inkjet printer according to claim 1, wherein
the command receiver includes a communication part which communicates with an external information processing apparatus.

4. The ink-jet printer according to claim 1, wherein
the controller controls the recording head to discharge ink of the ink amount dispersed in α times of the flushing processes, under a condition that the determined ink amount is less than the first threshold value and that α is not less than 2.

5. The ink-jet printer according to claim 1, wherein
the controller increases the number-of-times β of the flushing processes such that the larger the determined ink amount is, the more the number-of-times β of the flushing processes is increased.

6. An ink-jet printer, comprising:
a conveyor configured to convey a sheet in a conveyance direction;
a carriage being movable in a scanning direction along a sheet facing area, the scanning direction intersecting the conveyance direction, and the sheet facing area facing the sheet conveyed by the conveyor;
a recording head mounted on the carriage to discharge ink from a plurality of nozzles aligned in the scanning direction;
an ink receiver disposed to face the recording head that is located at a first position displaced in the scanning direction from the sheet facing area;
a command receiver; and
a controller configured to control the conveyor, the carriage and the recording head to execute:
  determining an amount of ink to be discharged to the receiver by the recording head;
  performing a flushing process in which the carriage is moved to an area facing the ink receiver and the ink of the determined ink amount is discharged from each of the plurality of the nozzles, under a condition that the command receiver receives a recording command which is an instruction to record an image on the sheet;
  performing a printing process, under a condition that the flushing process has finished;
  discharging the ink of the determined ink amount in α times of the flushing processes, under a condition that the determined ink amount is less than a first threshold value; and
  discharging the ink of the determined ink amount dispersed in β(β>α) times of the flushing processes, under a condition that the determined ink amount is not less than the first threshold value, the ink-jet printer further comprising a sensor mounted in the carriage to detect that the sheet conveyed by the conveyor has reached the sheet facing area,
wherein the controller controls the conveyor, the carriage and the recording head to execute:
  moving the carriage in a direction approaching the sheet facing area, in a final flushing process;
  performing a first moving process which causes the carriage which is in motion to reach the sheet facing area without stopping the carriage, under a condition that the ink has been discharged from all of the nozzles in the final flushing process;
  conveying the sheet toward the sheet facing area; and
  performing the printing process, under a condition that the sensor detects the conveyed sheet.

7. The ink-jet printer according to claim 6, wherein
the controller controls the carriage to execute:
  moving at a first speed in the flushing process, under a condition that the determined ink amount is less than a second threshold value; and
  moving at a second speed which is slower than the first speed in the flushing process under a condition that the determined ink amount is not less than the second threshold value.

8. The ink-jet printer according to claim 7, wherein
the second threshold value is smaller than the first threshold value.

9. The ink-jet printer according to claim 7, wherein
the controller controls the carriage to execute:
  moving at the second speed in the flushing process, under a condition that the determined ink amount is not less than the second threshold value; and
  moving at a third speed which is faster than the second speed in the first moving process.

10. The inkjet printer according to claim 6, further comprising
a power supply configured to supply a drive voltage to the recording head,
wherein the controller controls the recording head and the power supply to execute:
  raising the drive voltage to a first voltage under a condition that the determined ink amount is less than a third threshold value, and raising the drive voltage to a second voltage higher than the first voltage under a condition that the determined ink amount is not less than the third threshold value;
  performing the flushing process, under a condition that the command receiver has received the recording command and that raising the drive voltage has finished;
  in parallel, performing the first moving process and lowering the drive voltage from the second voltage to the first voltage, under a condition that the flushing process after raising the drive voltage to the second voltage has finished; and
  performing the printing process, under a condition that performing the first moving process has finished and the drive voltage becomes the first voltage.

11. The inkjet printer according to claim 10, further comprising:
a cap facing the recording head in a case that the carriage is positioned in a second position which is a position displaced in the scanning direction from the sheet facing area, the second position being different from the first position; and
a cap shifter configured to move the cap relative to the recording head, between a covering position where the cap closely contacts the recording head to cover the nozzle and a separated position where the cap is separated from the recording head,
wherein under a condition that the command receiver receives a preceding command giving prior notice of transmission of the recording command, the controller controls the power supply and the cap shifter to execute, in parallel with raising the drive voltage:
  taking the cap off the recording head by changing a relative position of the recording head and the cap from the covering position to the separated position; and performing a second moving process in which the carriage is moved from the second position toward the first position, in a case that the cap and the recording head has separated.

12. The inkjet printer according to claim 11, wherein the controller determines the ink amount such that the longer an elapsed time from most recently executing the flushing process to receiving the preceding command is, the larger the ink amount is determined to be.

13. An ink-jet printer, comprising:
a conveyor configured to convey a sheet in a conveyance direction;
a carriage being movable in a scanning direction along a sheet facing area, the scanning direction intersecting the conveyance direction, and the sheet facing area facing the sheet conveyed by the conveyor;
a recording head mounted on the carriage to discharge ink from a plurality of nozzles aligned in the scanning direction;
an ink receiver disposed to face the recording head that is located at a first position displaced in the scanning direction from the sheet facing area;
a command receiver; and
a controller configured to control the conveyor, the carriage and the recording head to execute:
  determining an amount of ink to be discharged to the receiver by the recording head;
  performing a flushing process in which the carriage is moved to an area facing the ink receiver and the ink of the determined ink amount is discharged from each of the plurality of the nozzles, under a condition that the command receiver receives a recording command which is an instruction to record an image on the sheet;
  performing a printing process, under a condition that the flushing process has finished;
  discharging the ink of the determined ink amount in $\alpha$ times of the flushing processes, under a condition that the determined ink amount is less than a first threshold value; and
  discharging the ink of the determined ink amount dispersed in $\beta(\beta>\alpha)$ times of the flushing processes, under a condition that the determined ink amount is not less than the first threshold value,
wherein the controller determines the ink amount discharged in a final flushing process, of a plurality of the flushing processes, larger than the ink amount discharged in the flushing process prior to the final flushing process, of the plurality of the flushing processes.

14. An ink-jet printer, comprising:
a conveyor configured to convey a sheet in a conveyance direction;
a carriage being movable in a scanning direction along a sheet facing area, the scanning direction intersecting the conveyance direction, and the sheet facing area facing the sheet conveyed by the conveyor;
a recording head mounted on the carriage to discharge ink from a plurality of nozzles aligned in the scanning direction;
an ink receiver disposed to face the recording head that is located at a first position displaced in the scanning direction from the sheet facing area;
a command receiver; and
a controller configured to control the conveyor, the carriage and the recording head to execute:
  determining an amount of ink to be discharged to the receiver by the recording head;
  performing a flushing process in which the carriage is moved to an area facing the ink receiver and the ink of the determined ink amount is discharged from each of the plurality of the nozzles, under a condition that the command receiver receives a recording command which is an instruction to record an image on the sheet;
  performing a printing process, under a condition that the flushing process has finished;
  discharging the ink of the determined ink amount in $\alpha$ times of the flushing processes, under a condition that the determined ink amount is less than a first threshold value; and
  discharging the ink of the determined ink amount dispersed in $\beta(\beta>\alpha)$ times of the flushing processes, under a condition that the determined ink amount is not less than the first threshold value,
wherein the controller,
  determines the ink amount discharged in a final flushing process, of a plurality of the flushing processes, smaller than the ink amount discharged in the flushing process prior to the final flushing process, of the plurality of the flushing processes, and
  determines a movement speed of the carriage in the final flushing process, of the plurality of the flushing processes, faster than a movement speed of the carriage in the flushing process prior to the final flushing process, of the plurality of flushing processes.

15. An ink-jet printer, comprising:
a conveyor configured to convey a sheet in a conveyance direction;
a carriage being movable in a scanning direction along a sheet facing area, the scanning direction intersecting the conveyance direction, and the sheet facing area facing the sheet conveyed by the conveyor;
a recording head mounted on the carriage to discharge ink from a plurality of nozzles aligned in the scanning direction;
an ink receiver disposed to face the recording head that is located at a first position displaced in the scanning direction from the sheet facing area;
a command receiver; and
a controller configured to control the conveyor, the carriage and the recording head to execute:
  determining an amount of ink to be discharged to the receiver by the recording head;
  performing a flushing process in which the carriage is moved to an area facing the ink receiver and the ink of the determined ink amount is discharged from each of the plurality of the nozzles, under a condition that the command receiver receives a recording command which is an instruction to record an image on the sheet;
  performing a printing process, under a condition that the flushing process has finished;
  discharging the ink of the determined ink amount in $\alpha$ times of the flushing processes, under a condition that the determined ink amount is less than a first threshold value; and
  discharging the ink of the determined ink amount dispersed in $\beta(\beta>\alpha)$ times of the flushing processes, under a condition that the determined ink amount is not less than the first threshold value,
wherein in a case that $\beta=3$, the controller controls the carriage to execute:

moving in a direction approaching the sheet facing area in the first time and the third time of the flushing processes; and moving in a direction moving away from the sheet facing area in the second time of the flushing processes.

16. An ink-jet printer, comprising:

a conveyor configured to convey a sheet in a conveyance direction;

a carriage being movable in a scanning direction along a sheet facing area, the scanning direction intersecting the conveyance direction, and the sheet facing area facing the sheet conveyed by the conveyor;

a recording head mounted on the carriage to discharge ink from a plurality of nozzles aligned in the scanning direction;

an ink receiver disposed to face the recording head that is located at a first position displaced in the scanning direction from the sheet facing area;

a command receiver; and a controller configured to control the conveyor, the carriage and the recording head to execute:

determining an amount of ink to be discharged to the receiver by the recording head;

performing a flushing process in which the carriage is moved to an area facing the ink receiver and the ink of the determined ink amount is discharged from each of the plurality of the nozzles, under a condition that the command receiver receives a recording command which is an instruction to record an image on the sheet;

performing a printing process, under a condition that the flushing process has finished;

discharging the ink of the determined ink amount in $\alpha$ times of the flushing processes, under a condition that the determined ink amount is less than a first threshold value; and discharging the ink of the determined ink amount dispersed in $\beta(\beta>\alpha)$ times of the flushing processes, under a condition that the determined ink amount is not less than the first threshold value, wherein the controller is configured to execute the recording process in a high image quality mode or a low image quality mode, in a case that the command receiver has received a first command which is an instruction to perform the recording process in the high image quality mode, the controller determines the ink amount to a first ink amount, and in a case that the command receiver has received a second command which is an instruction to perform the recording process in the low image quality mode, the controller determines the ink amount to a second ink amount which is smaller than the first ink amount.

* * * * *

UNITED STATES PATENT AND TRADEMARK OFFICE
CERTIFICATE OF CORRECTION

PATENT NO. : 10,232,625 B2  
APPLICATION NO. : 15/470644  
DATED : March 19, 2019  
INVENTOR(S) : Satoru Arakane Page 1 of 1

It is certified that error appears in the above-identified patent and that said Letters Patent is hereby corrected as shown below:

In the Claims

<u>Claim 2:</u>
Column 25, Line 1: Delete "inkjet" and insert -- ink-jet --, therefor.

<u>Claim 3:</u>
Column 25, Line 6: Delete "inkjet" and insert -- ink-jet --, therefor.

<u>Claim 10:</u>
Column 26, Line 23: Delete "inkjet" and insert -- ink-jet --, therefor.

<u>Claim 11:</u>
Column 26, Line 47: Delete "inkjet" and insert -- ink-jet --, therefor.

<u>Claim 12:</u>
Column 27, Line 5: Delete "inkjet" and insert -- ink-jet --, therefor.

Signed and Sealed this
Twenty-first Day of May, 2019

Andrei Iancu
*Director of the United States Patent and Trademark Office*